United States Patent
Sela et al.

(10) Patent No.: US 10,628,379 B1
(45) Date of Patent: Apr. 21, 2020

(54) EFFICIENT LOCAL DATA PROTECTION OF APPLICATION DATA IN STORAGE ENVIRONMENTS

(71) Applicant: EMC IP Holding Company LLC, Hopkinton, MA (US)

(72) Inventors: Nir Sela, Tzur Igal (IL); Aviram Katz, Kiryat Onno (IL); Aharon Blitzer, Shoham (IL); Tamir Segal, Sunnyvale, CA (US); Ido Halevi, Givat Ada (IL); Yuval Harduf, Yahud (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 293 days.

(21) Appl. No.: 15/198,430

(22) Filed: Jun. 30, 2016

Related U.S. Application Data

(63) Continuation-in-part of application No. 14/502,250, filed on Sep. 30, 2014, now Pat. No. 9,934,302.

(51) Int. Cl.
| | |
|---|---|
| *G06F 16/00* | (2019.01) |
| *G06F 16/11* | (2019.01) |
| *G06F 11/20* | (2006.01) |
| *G06F 7/32* | (2006.01) |
| *G06F 16/182* | (2019.01) |

(52) U.S. Cl.
CPC ............. *G06F 16/128* (2019.01); *G06F 7/32* (2013.01); *G06F 11/2064* (2013.01); *G06F 11/2082* (2013.01); *G06F 16/1844* (2019.01)

(58) Field of Classification Search
CPC ...... G06F 16/113; G06F 16/27; G06F 16/178; G06F 16/128; G06F 16/188
See application file for complete search history.

(56) References Cited

U.S. PATENT DOCUMENTS

| | | |
|---|---|---|
| 7,257,689 B1 | 8/2007 | Baird |
| 7,987,156 B1 | 7/2011 | Chatterjee et al. |
| 8,335,771 B1 | 12/2012 | Natanzon et al. |
| 8,423,733 B1 | 4/2013 | Ozdemir |
| 2005/0066095 A1 | 3/2005 | Mullick et al. |
| 2005/0246503 A1 | 11/2005 | Fair |
| 2006/0218364 A1 | 9/2006 | Kitamura |
| 2007/0112714 A1 | 5/2007 | Fairweather |
| 2007/0233704 A1* | 10/2007 | Shiga .................. H04L 67/1095 |
| 2007/0283120 A1* | 12/2007 | Fujita .................... G06F 3/0613 711/170 |
| 2008/0183973 A1* | 7/2008 | Aguilera ............. G06F 11/1464 711/147 |
| 2010/0042802 A1 | 2/2010 | Helman et al. |

(Continued)

OTHER PUBLICATIONS

Xiao, Weijun, et al. "Implementation and performance evaluation of two snapshot methods on iSCSI target storages." Proc. of NASA/IEEE Conference on Mass Storage Systems and Technologies. 2006.*

(Continued)

*Primary Examiner* — Nan Hutton

(74) *Attorney, Agent, or Firm* — Ryan, Mason & Lewis, LLP

(57) ABSTRACT

Example embodiments of the present invention relate to a method, a system, and a computer program product for data protection. The method includes creating a snapshot of a volume and maintaining the snapshot as a logical point in time copy of the volume for data protection of the volume.

21 Claims, 15 Drawing Sheets

REFRESH SNAPSHOT FROM DEVICE

(56) References Cited

U.S. PATENT DOCUMENTS

2011/0099342 A1 4/2011 Ozdemir
2015/0370502 A1* 12/2015 Aron .................... G06F 3/0626
                                                    711/162

OTHER PUBLICATIONS

Xiaojia, Xiang, Yu Hongliang, and Shu Jiwu. "Storage virtualization based asynchronous remote mirror." 2009 Eighth International Conference on Grid and Cooperative Computing. IEEE, 2009.*
Guy et al., "Rumor: Mobile Data Access Through Optimistic Peer-To-Peer Replication," Advances in Database Technologies, Springer, Berlin, Heidelberg, 1999, pp. 1-12.
Rabinovich et al., "A Dynamic Object Replication and Migration Protocol for an Internet Hosting Service," Distributed Computing Systems, Proceedings, 19th IEEE International Conference on IEEE, vol. 1, 1999 pp. 1-13.
Amjad et al., "A Survey of Dynamic Replication Strategies for Improving Data Availability in Data Grids," Future Generation Computer Systems 28, 2011, pp. 337-349.

\* cited by examiner

CREATE SNAPSHOT FROM DEVICE

REFRESH SNAPSHOT FROM DEVICE

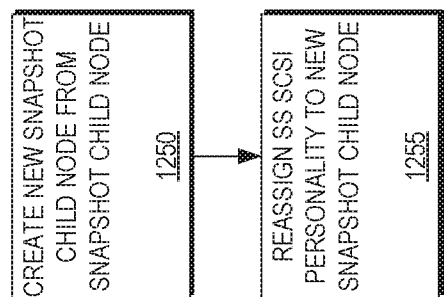
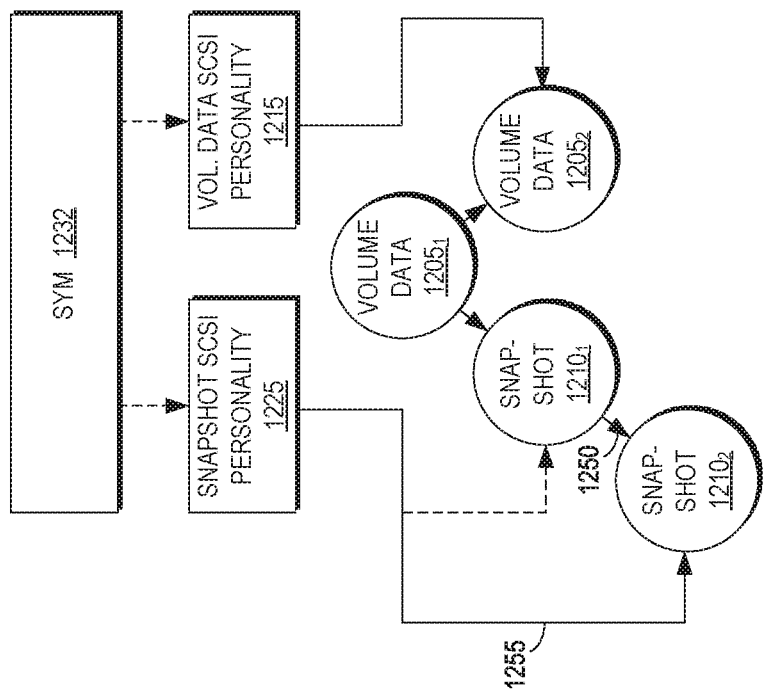
FIG. 12A
RESTORE SNAPSHOT FROM SNAPSHOT
FIG. 12B

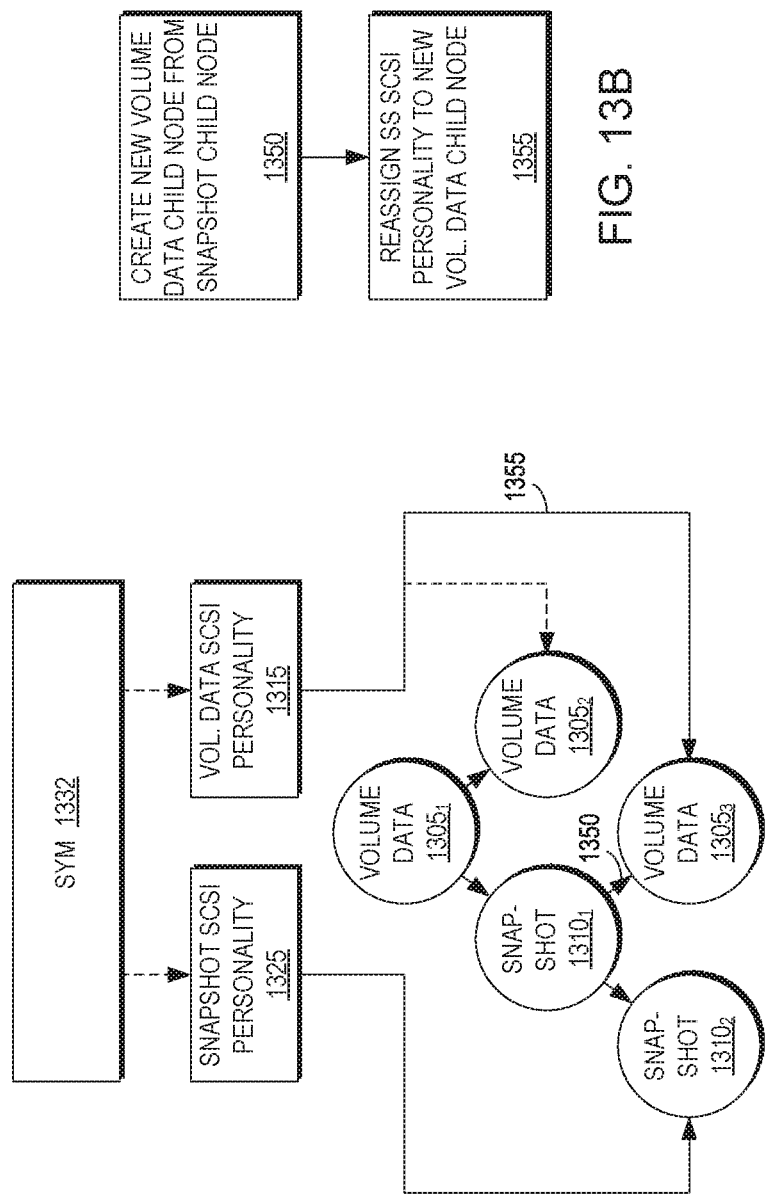

EFFICIENT LOCAL DATA PROTECTION OF APPLICATION DATA IN STORAGE ENVIRONMENTS

CROSS REFERENCE TO RELATED APPLICATION

This Application is a Continuation-in-Part Application of U.S. patent application Ser. No. 14/502,250, now U.S. Pat. No. 9,934,302 issued on Apr. 13, 2018, entitled "METHOD AND APPARATUS FOR PERFORMING REPLICATION TO A DEVICE WHILE ALLOWING APPLICATION ACCESS" filed on Sep. 30, 2014, and is related to U.S. Pat. No. 9,141,290 entitled "SNAPSHOT MECHANISM" issued on Sep. 22, 2015, and U.S. patent application Ser. No. 15/198,353 entitled "EFFICIENT REPURPOSING OF APPLICATION DATA IN STORAGE ENVIRONMENTS" filed on even date herewith, the teachings of which patent and patent applications are incorporated herein by reference in their entirety.

A portion of the disclosure of this patent document may contain command formats and other computer language listings, all of which are subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

This application relates to data storage and, more specifically, to copy data management.

BACKGROUND

Storage systems in general, and block based storage systems specifically, are a key element in modern data centers and computing infrastructure. These systems are designed to store and retrieve large amounts of data, by providing data block address and data block content—for storing a block of data—and by providing a data block address for retrieval of the data block content that is stored at the specified address.

Storage solutions are typically partitioned into categories based on a use case and application within a computing infrastructure, and a key distinction exists between primary storage solutions and archiving storage solutions. Primary storage is typically used as the main storage pool for computing applications during application run-time. As such, the performance of primary storage systems is very often a key challenge and a major potential bottleneck in overall application performance, since storage and retrieval of data consumes time and delays the completion of application processing. Storage systems designed for archiving applications are much less sensitive to performance constraints, as they are not part of the run-time application processing.

In general, computer systems grow over their lifetime and the data under management tends to grow over the system lifetime. Growth can be exponential, and in both primary and archiving storage systems, exponential capacity growth typical in modern computing environment presents a major challenge as it results in increased cost, space, and power consumption of the storage systems required to support ever increasing amounts of information.

SUMMARY

Example embodiments of the present invention relate to a method, a system, and a computer program product for data protection. The method includes creating a snapshot of a volume and maintaining the snapshot as a logical point in time copy of the volume for data protection of the volume.

BRIEF DESCRIPTION OF THE DRAWINGS

Objects, features, and advantages of embodiments disclosed herein may be better understood by referring to the following description in conjunction with the accompanying drawings. The drawings are not meant to limit the scope of the claims included herewith. For clarity, not every element may be labeled in every Figure. The drawings are not necessarily to scale, emphasis instead being placed upon illustrating embodiments, principles, and concepts. Thus, features and advantages of the present disclosure will become more apparent from the following detailed description of exemplary embodiments thereof taken in conjunction with the accompanying drawings in which:

FIGS. 12A and 12B are a block diagram and a flow diagram, respectively, of a snapshot operation to restore a snapshot from a snapshot according to an example embodiment of the present invention;

FIGS. 13A and 13B are a block diagram and a flow diagram, respectively, of a snapshot operation to promote a snapshot for production use according to an example embodiment of the present invention;

DETAILED DESCRIPTION

Figure 1:
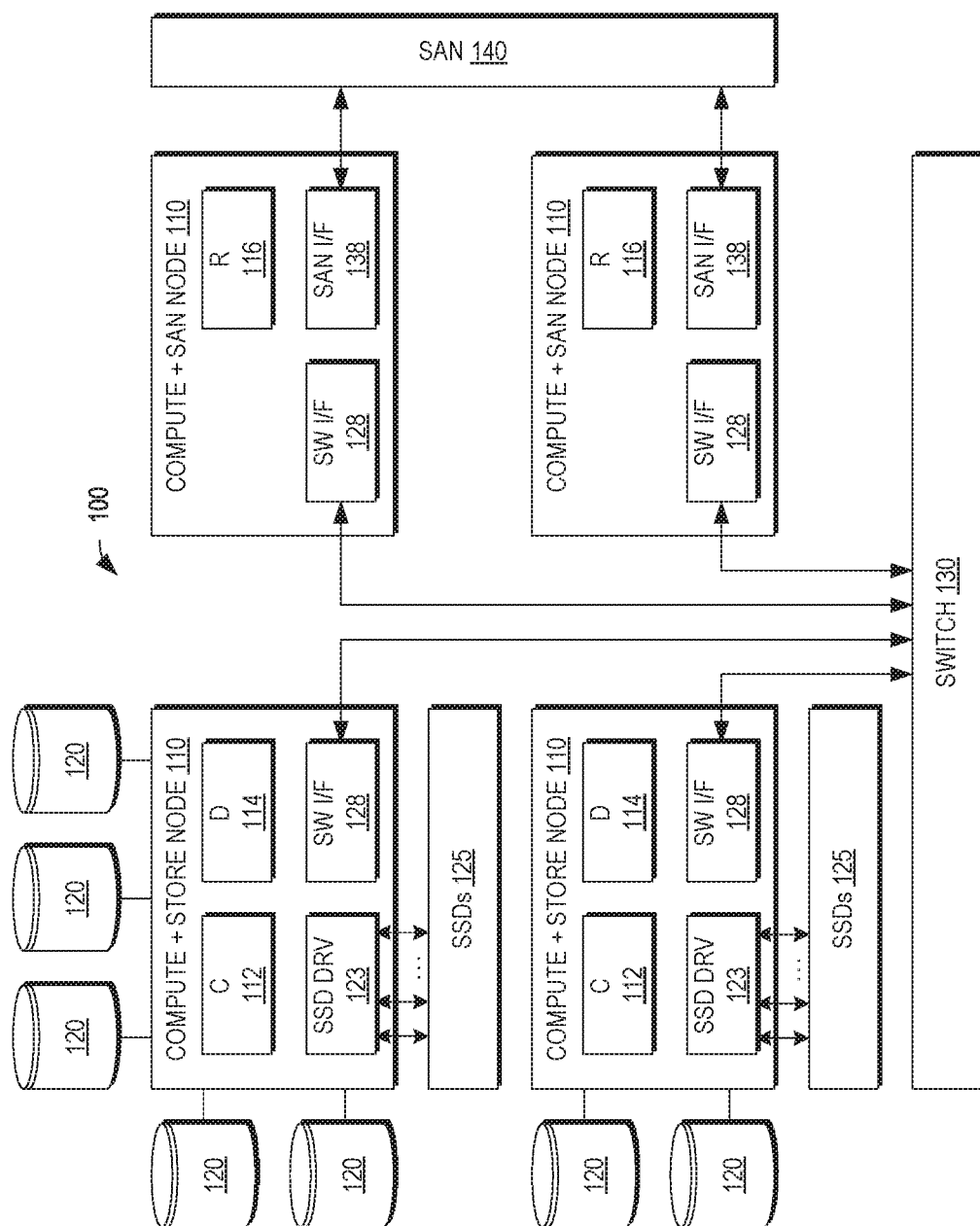
FIG. 1 is a block diagram illustrating a system for data storage, having separate control and data planes, according to an example embodiment of the present invention.

In general, many data storage systems, and especially primary storage solutions, rely on address-based mapping of data, as well as address-based functionality of the storage system's internal algorithms. However, a different scheme in which data, internally within the storage system, is mapped and managed based on its content instead of its address, has many substantial advantages. For example, it improves storage capacity efficiency since any duplicate block data will only occupy actual capacity of a single instance of that block. As another example, it improves performance since duplicate block writes do not need to be executed internally in the storage system.

Traditional storage systems (e.g., primary storage systems or archiving storage systems) may be incapable of supporting the combination of content based storage (with its numerous advantages) and ultra-high performance. This is a result of the fact that the implementation of content based storage scheme may face several challenges:

(a) intensive computational load which is not easily distributable or breakable into smaller tasks;

(b) an inherent need to break large blocks into smaller block sizes, which dramatically degrades the performance of existing storage solutions, in order to achieve content addressing at fine granularity;

(c) inability to maintain sequential location of data blocks within the storage systems, since mapping is not address based any more, and such inability causes dramatic performance degradation with traditional spinning disk systems; and (d) the algorithmic and architectural difficulty in distributing the tasks associated with content based mapping over a large number of processing and storage elements while maintaining single content-addressing space over the full capacity range of the storage system.

Examples embodiments of the present invention include a networked memory system which may include multiple memory storage units arranged for content addressable storage of data. The design may be based on a distributed architecture, where computational, Storage Area Networking (SAN), and storage elements are distributed over multiple physical nodes, with nodes being interconnected over an internal network through a switch device. The distributed architecture enables the scaling of the system's capabilities in multiple aspects, including overall storage capacity, performance characteristics in bandwidth and I/O operations per second (IOPS), computational resources, internal and external networking bandwidth, etc. However, while being based on a distributed architecture, the system presents, externally, a unified storage system entity with scalable capabilities.

According to an example embodiment, a block-level Content Addressable Storage (CAS) array may store data in and access data from memory by assigning addresses to fixed size chunks (i.e., blocks) of data. In example embodiments of the present invention, a relatively small granularity may be used (e.g., 4 KB); however, it should be understood that smaller or larger block sizes may be selected at the discretion of one of ordinary skill in the art. The specific numbers for granularity can be set based on various design tradeoffs, and the specific number used herein of 4 KB is merely an example.

Further, in example embodiments, each address may be a number in some range, and the range may indicate the amount of available memory to be written and read. In embodiments employing thin provisioning, the range of addresses can be much larger than the actual amount of available memory and the address to data mapping array can be viewed as a sparse array, where many addresses do not have a value, and the mapping can be viewed as being from logical user address to internal physical location.

Moreover, in example embodiments, hashing is used for the content addressing and, in a preferred embodiment, the hashing produces evenly distributed results over the allowed input range. In other words, in example embodiments of the present invention, hashing defines the physical addresses so that data storage makes even use of the system resources. For example, each block has a unique hash signature (e.g., 20B) saved in memory (e.g., Flash). Therefore, the granularity enables the storage array to detach the incoming user access pattern from the internal access pattern; that is to say the incoming user access pattern may be larger than the granularity (e.g., 4 KB) or other system-determined page size and may thus be converted to a plurality of write operations within the system, each one separately hashed and separately stored.

In example embodiments of the present invention, content addressable data storage can be used to ensure that data appearing twice is stored at the same location. Hence, in a preferred embodiment, unnecessary duplicate write operations can be identified and avoided. In some embodiments, such a feature may be included in the present system as data deduplication. Data mapping within the system of example embodiments of the present invention is designed not only to improve performance, but also to improve the life span and reliability of the electronic memory media, in cases where the memory technology used has limitations on write/erase cycles, as is the case with Flash memory. Lifetime maximization may be achieved by avoiding unnecessary write operations as will be explained in greater detail below.

In some embodiments employing data deduplication, identical chunks of data may appear under different addresses. In such embodiments, to avoid holding two or more duplicate copies of the same data chunk (i.e., deduplication), another layer of indirection may be introduced and, instead of mapping multiple addresses to the same chunk of data, one can map addresses to much shorter hash digests of typically a few bytes, representing the 4 KB data chunks, and further map these hash digests to the internal physical location according to the actual data they represent. Accordingly, this scheme maps blocks of data internally according to their content, resulting in mapping of identical blocks to the same unique internal location.

The distributed CAS algorithm in example embodiments of the present invention allows for scaling of the CAS domain as overall system capacity grows, effectively utilizing and balancing the available computational and storage elements in order to improve overall system performance at any scale and with any number of computational and storage elements. The examples described herein may overcome the scalability challenge by providing data flow (i.e., write, read) that is distributed among an arbitrary and scalable number of physical and logical nodes. For example, embodiments distribute computation-intensive tasks (e.g., calculating cryptographic hash values), as well as metadata and its access, among an arbitrary number of nodes. Furthermore, data flow algorithms may partition read/write operations in an optimally-balanced way, over an arbitrary and scalable number of nodes, while guaranteeing consistency and inline deduplication effect over the complete storage space.

In example embodiments of the present invention, the system's architecture and internal algorithms implementing the storage functions may be optimized for improved utilization of the capabilities of random-access memory/storage media, as opposed to and in contrast with mechanical-magnetic spinning disk storage media. For example, example embodiments of the present invention may employ more than a single type of memory technology, including a mix of more than one Flash technology (e.g., single level cell (SLC) Flash and multilevel cell (MLC) Flash, and a mix of Flash and random-access memory media, including dynamic random-access memory (DRAM) or other memory technologies, whether persistent or non-persistent, and is typically characterized by random seek/access times and random read/write speeds substantially higher than those exhibited by spinning disk media. Such combinations of memory/storage technologies may provide further performance optimization, life span maximization, and cost optimization. For example, the data mapping may optimize performance and life span by taking advantage of the different access speeds and different write/erase cycle limitations of the various memory technologies. Moreover, certain optimizations or benefits of using Flash technology, such as inline deduplication and breaking incoming write operations into smaller blocks for distribution over a plurality of processing nodes, may be less suitable in a spinning-disk environment and may degrade storage system performance to extremely low levels.

As will be described in greater detail below, in certain embodiments, data may be transferred to and from storage units using separate data and control planes. Separation of control and data may enable a substantially unlimited level of scalability because control operations can be split over any number of processing elements and data operations can be split over any number of data storage elements. Accordingly, in such embodiments, this allows scalability in both capacity and performance, and may thus permit an operation to be effectively balanced between the different modules and nodes.

In example embodiments of the present invention, the separation of control and data may also help to speed the operation of the system; that is to say it may speed up writes and reads due to, for example, (a) parallel operation of certain control and data actions over multiple nodes/modules; and (b) use of optimal internal communication/networking technologies per the type of operation (e.g., control or data), designed to minimize the latency (i.e., delay) and maximize the throughput of each type of operation.

In other embodiments, separation of control and data paths may allow each control or data information unit to travel within the system between nodes or modules in an optimal way, meaning only to where it is needed and if/when it is needed. It should be understood that, in certain embodiments, the set of optimal where and when coordinates is not the same for control and data units and, hence, the separation of control and data paths ensures the optimization of such data and control movements in a way which is not otherwise possible. In certain embodiments, the separation is important in keeping the workloads and internal communications at the minimum necessary, and may translate into increased optimization of performance.

A glossary is now given of terms used in the following description:

D BACKUP—may be the D module responsible for storing a backup for an X-Page Data which is stored in a non-volatile way (e.g., NVRAM or UPS protected);

D PRIMARY may be the D module responsible for storing an X-Page's Data;

LOGICAL BLOCK (LB) may be a sector- (e.g., 512B) aligned chunk, which is the Small Computer System Interface (SCSI) base unit for disk operations;

LOGICAL BLOCK ADDRESS (LBA) may be the logical address of a Logical Block and contains a LUN identifier as well as the offset of the logical block within the LUN;

LOGICAL UNIT NUMBER (LUN) may be a common name in the industry for designating a volume of data, or a group of data blocks being named with the LUN. Each data block is referred to, by the external user of the storage system, according to its LUN, and its address within this LUN;

LOGICAL X-PAGE ADDRESS (LXA) may be the logical address of an X-Page and contains a LUN identifier as well as the offset of the X-Page within the LUN;

SUB-LUN (SL) may be a division of a LUN into smaller logical areas, to balance the load between C modules;

SUB-LUN UNIT SIZE (SLUS) may be the fixed size of a sub-LUN;

X-PAGE may be a predetermined-size aligned chunk as the base unit for memory and disk operations (e.g., 4 KB, however other smaller or larger values can be used as well and nothing in the design is limited to a specific value); and X-PAGE DATA may be a specific sequence of user data values that resides in an X-Page and is uniquely represented in the system by its hash digest.

FIG. 1 is a block diagram of a system 100 for scalable block data storage and retrieval using content addressing according to an example embodiment of the present invention. The system 100 includes data storage devices 120 on which the data blocks are stored. The storage devices 120 may be solid state random access storage devices, as opposed to spinning disk devices; however disk devices may be used instead or in addition. The storage devices 120 are networked to computing modules, there being several kinds of I/O modules around which the system 100 is architected, including control (C) modules 112, data (D) modules 114, routing (R) modules 116, and hash (H) modules (described below with reference to FIG. 2).

The modules are combined into nodes 110 on the network, and the nodes 110 are connected via respective switch interfaces 128 over the network by a switch 130. As will be described in greater detail below, certain nodes 110 also may be connected via respective storage area network (SAN) interfaces 138 to a SAN 140. The modules carry out content addressing for storage and retrieval, and the network defines separate paths or planes: control paths or a control plane via the control modules 112; and data paths or a data plane via the data modules 114. It should be understood that, modular and scalable, any system configuration includes at least one control module 112, one data module 114, one routing module 116, and one hash module, but may include a multiplicity of any or all of these modules. The nodes 110 also may include a solid-state drive (SSD) driver module 123 providing connectivity to one or more SSDs 125.

As illustrated in FIG. 1, the control modules 112 control execution of read and write commands. The data modules 114 are connected to the storage devices 120 and, under control of a respective control module 112, pass data to or from the storage devices 120. Both the control modules 112 and data modules 114 may retain extracts of the data stored in the storage device 120, and the extracts may be used for the content addressing. Typically the extracts may be computed by cryptographic hashing of the data, as will be discussed in greater detail below, and hash modules (as described with reference to FIG. 2) may specifically be provided for this purpose. In other words, the hash modules calculate hash values for data which is the subject of storage commands, and the hash values calculated may later be used for retrieval.

As illustrated in FIG. 1, routing modules 116 terminate storage and retrieval operations and distribute command parts of operations to control modules 112 that are explicitly selected for the operation in such a way as to retain balanced usage within the system 100. The routing modules 116 may use hash values, calculated from data associated with the operations, to select the control module 112 for the distribution. More particularly, selection of the control module 112 may use hash values, but typically relies on the user address and not on the content (i.e., hash). The hash value is, however, typically used for selecting the data module 114 and for setting the physical location for data storage within a data module 114.

For example, the system 100 may inherently enable inline block deduplication which may improve performance and save capacity by avoiding performing a write in cases of duplicate data blocks. More specifically, the routing modules 116 and/or data modules 114 may compare the extracts (i.e., hash values) of write data with those of data already stored and, where a match is found, point to the matched data and avoid rewriting. The use of content addressing with multiple data modules 114 selected on the basis of the content hashing, and a finely-grained mapping of user addresses to control modules 112, allows for a scalable distributed architecture. Moreover, content- (i.e., hash) based mapping to data modules 114 and storage devices 120 results in optimal wear-leveling, thereby ensuring equal spread of write operations to data modules 114 and storage devices 120 independently of the user data/address access patterns.

In detaching the data from the incoming pattern, the routing module 116 breaks up any incoming block which is larger than the granularity size across sub-LUNs, sending the relevant parts to the appropriate control modules 112. Each control module 112 is predefined to handle a range or set of sub-LUN logical addresses. The control module 112 breaks up the block it receives for distribution to data modules 114, at a predetermined granularity, which is the granularity for which a hash is calculated. Therefore, the end result is that a request to write a certain block (e.g., of size 64 KB) ends up being broken up into multiple internal writes (e.g., 16), each write comprising a 4 KB block.

Additionally, in other embodiments, scalability is inherent to the architecture. It should be understood that, in a preferred embodiment, nothing in the architecture limits the number of the different control, data, routing, and hash modules which are described further herein. Hence, in example embodiments, any number of such modules can be assembled and in any combination and, as appreciated by one of ordinary skill in the art, the more modules added, the higher the performance of the system becomes and the larger the capacity it can handle, thereby achieving scalability of performance and capacity.

Accordingly, and as described in greater detail below, example embodiments of the present invention (a) separate the control and data paths (i.e., the control modules 112 and data modules 114), (b) maintain optimal load balancing between data modules 114 based on the content of the blocks (i.e., through the CAS/hashing mechanisms), thereby ensuring balanced load sharing regardless of user access patterns, (c) maintain optimal load balancing between control modules 112, based on the user address of the blocks at a fine granularity, thereby ensuring balanced load sharing regardless of user access patterns, and (d) perform internal data path operations using small granularity block size, thereby detaching incoming user access patterns from internal access pattern, since the user pattern is generally larger than the block size.

Figure 2:
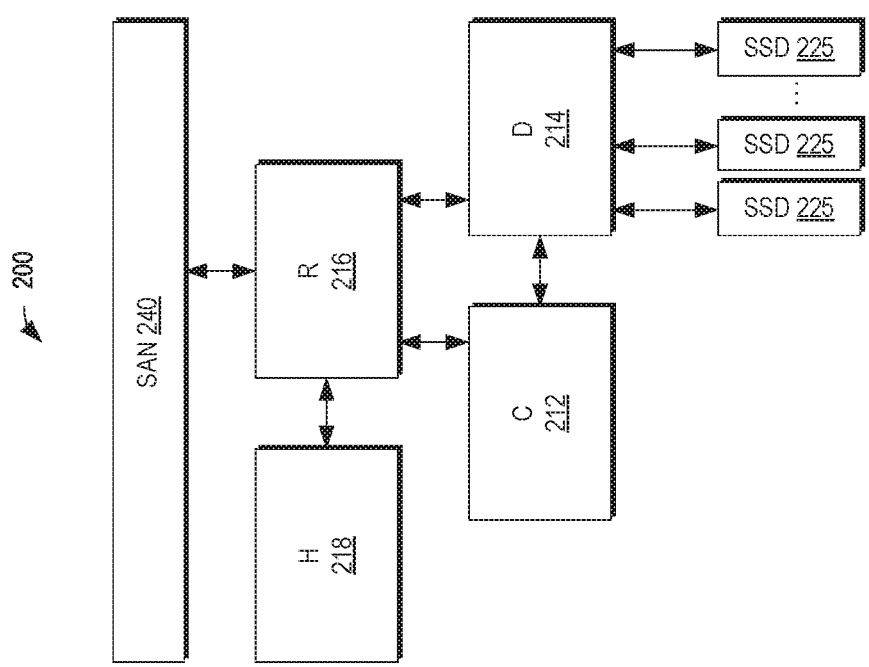
FIG. 2 is a block diagram illustrating a configuration of I/O modules for the system of FIG. 1 according to an example embodiment of the present invention.

FIG. 2 is a functional block diagram of a system according to an example embodiment of the present invention. As illustrated in FIG. 2, a hash module 218 is connected to a routing module 216 which, in turn, is connected to both a control module 212 and a data module 214. The data module 214 is connected to any number of memory devices, such as SSD 225. As illustrated in FIG. 2, the modules 212, 214, 216, 218 have the following functions:

A function of the hash module 218 is to calculate the hash function value for a given block of data;

A function of the routing module 216, which is connected to SAN 240, is to terminate SAN read/write commands (e.g., SCSI I/O requests) and route them to appropriate control modules 212 and data modules 214 for execution by these modules 212, 214. By doing so, the routing module 216 can distribute a workload over multiple control modules 212 and data modules 214 and, at the same time, create separation of the control and data planes (i.e., provide separate control and data paths);

A function of the control module 212 is to control execution of a read/write command, as well as other storage functions implemented by the system 200. It may maintain and manage key metadata elements; and A function of the data module 214 is to perform the actual read/write operation by accessing the storage devices 225 (i.e., designated SSDs) attached to it. The data module 214 may maintain metadata related with the physical location of data blocks.

FIGS. 3A-3D are block diagrams illustrating respective nodes 310A-D (310 generally) having varying functionalities according to the modules 312, 314, 316, 318 implemented thereon according to example embodiments of the present invention. As illustrated in FIGS. 3A-3D, each node type shows the functional modules that execute within the node in solid lines and functional modules that may optionally execute within the node in dashed lines. The control 312, data 314, routing 316, and hash 318 modules may be implemented in software and executed on a physical node 310.

Figure 3A:
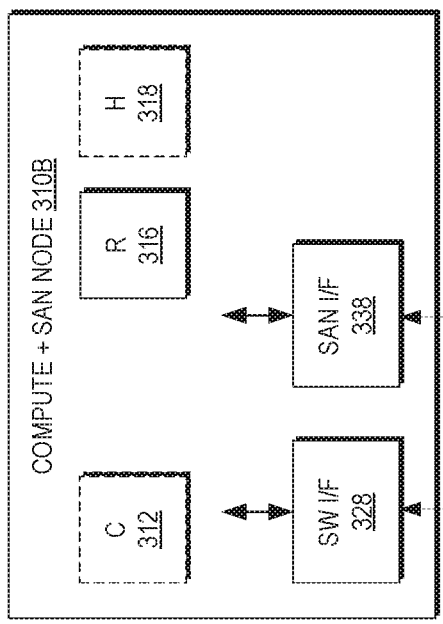
FIGS. 3A-3D are block diagrams illustrating node configurations for the system according to respective example embodiments of the present invention.
Figure 3B:
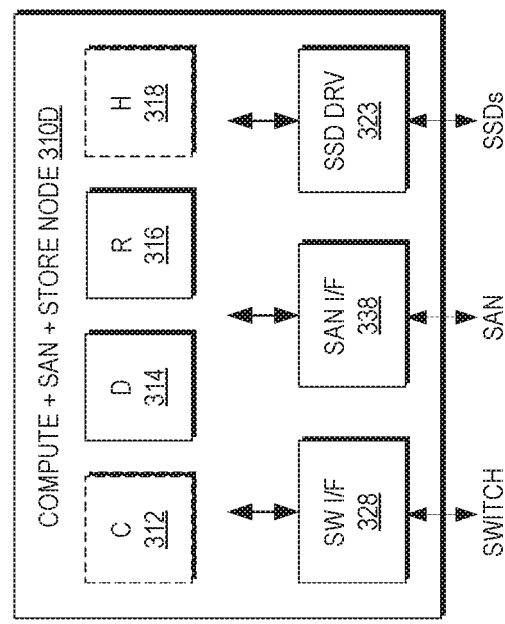
Figure 3C:
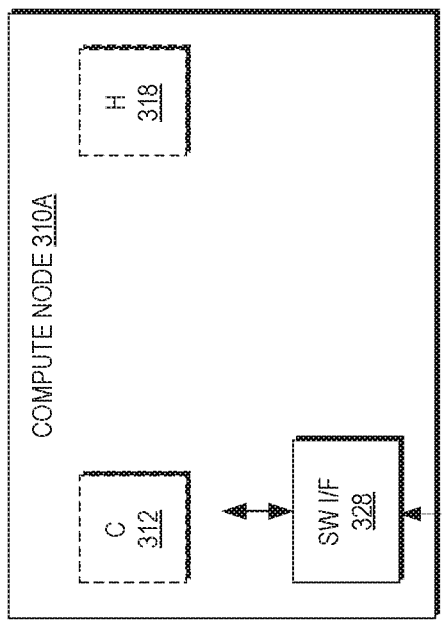
Figure 3D:
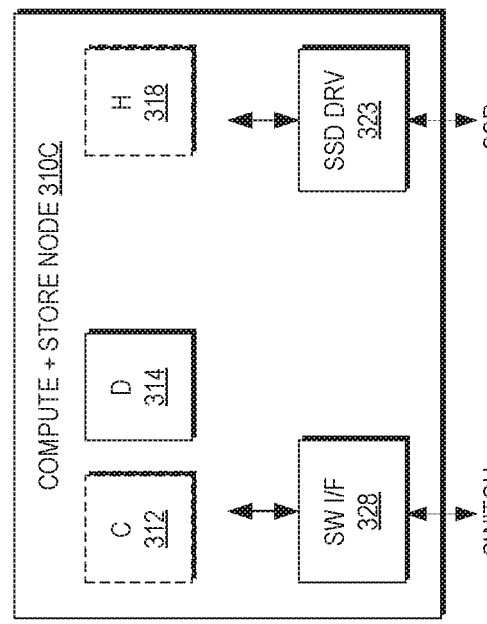

A system (e.g., the system 100 of FIG. 1) includes at least one physical node 310 and may include multiple nodes 310. FIGS. 3A-3D illustrates four possible node 310 configurations: (1) a compute node 310A, which includes a control module 312 and a hash module 318 (FIG. 3A); (2) a compute+SAN node 310B, which includes a control module 312, a routing module 316 and a hash module 318 (FIG. 3B); (3) a compute+store node 310C, which includes a control module 312, a data module 314, and a hash module 318 (FIG. 3C); and (4) a compute+SAN+store node 310D, which includes a control module 312, a data module 314, a routing module 316, and a hash module 318 (FIG. 3D). A system includes a SAN function within at least one node (i.e., node 310B and node 310D) and a store function within at least one node (i.e., node 310D). The SAN function and the store function can be supported by the same physical node or any combination of multiple nodes.

As illustrated in FIGS. 3A-3D, all nodes 310 include a switch interface 328 to enable interconnecting nodes 310 with a switch (e.g., switch 130 of FIG. 1) in a multi-node system configuration. A node 310 that contains a SAN function (e.g., node 310B or node 310D) includes at least one SAN interface 338 and at least one routing module 316. A node 310 that contains a store function (e.g., node 310C or node 310D) includes at least one SSD driver module 323 and at least one data module 314. Therefore, compute+SAN nodes 310B and compute+SAN+store nodes 310D also contain a SAN interface 338 to interface with the external SAN (e.g., SAN 140 of FIG. 1). The SAN interface 338 may use a SCSI-based protocol running on any of a number of interfaces including Fiber Channel, Ethernet, and others, through which read/write and other storage function commands are to the system. Moreover, compute+store nodes 310C and compute+SAN+store 310D contain an SSD driver module 323 to interface with SSDs (e.g., SSDs 125 of FIG. 1) attached to that node 310, where data is stored and accessed.

Figure 4:
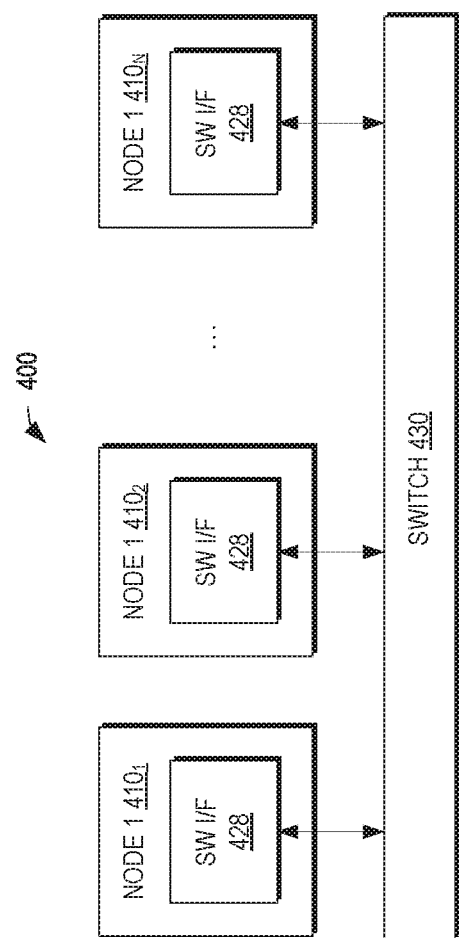
FIG. 4 is a block diagram illustrating a plurality of nodes connected to a switch according to an example embodiment of the present invention.

FIG. 4 is a high level system 400 block diagram according to an example embodiment of the present invention. The system 400 includes a plurality of N nodes $410_{1-N}$. In all embodiments in which the system 400 includes a plurality of nodes 410, all physical nodes 410 are interconnected via switch interfaces 428 by a switch 430 which may be based on any of a number of networking technologies including Ethernet, InfiniBand, and so forth. In the specific case of a two-node system, the two nodes 410 may be interconnected, such as directly via their switch interfaces 428, without a need for a switch. The interconnections between each node 410 and the switch 430 may include redundancy so as to achieve high system availability with no single point of failure. In such a case, each node 410 may contain two or more switch interfaces 428, and the switch 430 may contain two or more ports per physical node 410.

Figure 5:
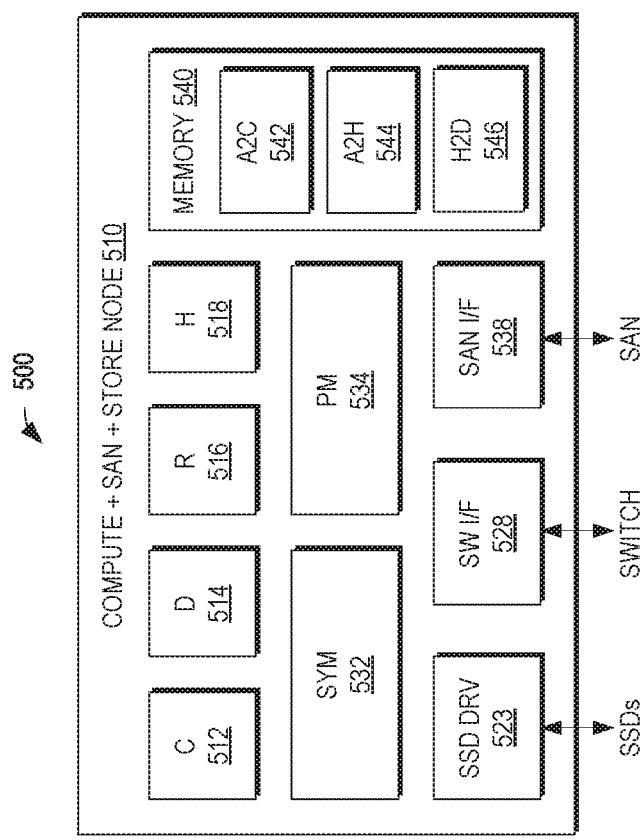
FIG. 5 is a block diagram illustrating a compute+SAN+store node according to an example embodiment of the present invention.

FIG. 5 is a block diagram of a single node 510 system 500 configuration according to an example embodiment of the present invention. As illustrated in FIG. 5, the node 510 includes a control module 512, a data module 514, a routing module 516, and a hash module 518 together in a compute+SAN+store node 510. A switch interface 528 links to a switch (e.g., switch 130 of FIG. 1), a SAN interface 538 provides an interface to a SAN (e.g., SAN 140 of FIG. 1), and an SSD driver 523 interfaces with the storage devices (e.g., SSDs 125 of FIG. 1).

Multiple nodes may be provided in a system (e.g., the system 100 of FIG. 1 having two compute+store nodes and two compute+SAN nodes). It should be understood that a system built from multiple physical nodes (e.g., the system 100 of FIG. 1) can inherently support a higher availability construction, where there is no single point of failure, in comparison with single node systems (e.g., the system 500 of FIG. 5). This means that any node or sub-node failure can be compensated for by redundant nodes in the system, having a copy of the system's meta-data, and a redundant copy of stored data (or parity information allowing recovery of stored data). The distributed and flexible architecture allows for seamless support of failure conditions by simply directing actions to alternate nodes.

In addition to the I/O modules (i.e., control module 512, data module 514, routing module 516, and hash module 518), each node 510 includes infrastructure modules including a system-wide management modules (SYM) 532 and a platform manager module (PM) 519.

The system-wide management module 532 provides a complete view of the hardware and software components of the storage system 500 and is responsible for system 500 availability and initiating changes in system configuration related to availability and redundancy. The system-wide management module 532 decides as to which modules (i.e., control module 512, data module 514, and routing module 516) are to execute on what node 510, initiates failovers of data ownership from one control module 512 to another, and initiates rebuilds upon SSD failures. In a preferred embodiment, only one system-wide management module 532 is an active management entity, and the sole entity that makes system-wide decisions, at any point in time. In multi-node 510 systems 500, should the node 510 on which the system-wide management module 532 is running fail, another system-wide management module 532 becomes active and takes over.

The platform manager module 519 runs on each node 510 and is responsible for all activities on the node 510. For example, the platform manager module 519: (1) monitors the health of the node 510, including hardware failures, and communicates it to the active system-wide management module 532 in the system 500; (2) is responsible for verifying that all processes are running properly on the node 510, including verifying that one and only one system-wide management module 532 is active in the system 500, thereby eliminating the possibility of not having a running system-wide management module 532; (3) executes module shutdowns and restarts on behalf of the system-wide management module 532; and (4) initiates a shutdown of the module 510 upon the discovery of loss of power and/or of the loss of communication with other nodes 510. Further, the platform manager module 519 facilitates the replicating (i.e., journaling) of important data structures between nodes 510 which are critical for redundancy of user data and system metadata. The platform manager module 519 replicates journal memories between nodes 510 by using Remote Direct Memory Access (RDMA) over the network fabric of the system 500.

As illustrated in FIG. 5, the system 500 includes a plurality of in-memory 540 data structures, including an address-to-control module (A2C) table 542, and address-to-hash (A2H) table 544, and a hash-to-disk (H2D) table 546. The A2C table 542 indicates which control module 512 is responsible for each logical X-Page address (LXA). The A2H table 544 maps each LXA that belongs to the SLs the control module 512 is responsible for to the hash digest representing the X-Page data that currently resides in this address. The H2D table 546 maps each range of hash digests to the corresponding data module 516 responsible for this range. A further structure used is the H2(D, $D_{BACKUP}$) table. The H2(D, $D_{BACKUP}$) table maps each range of hash digests to the corresponding data module 514 responsible for the range as well as the $D_{BACKUP}$ module responsible for the range, as will be described in greater detail below with respect to FIGS. 8 and 9.

Each control module 512 is responsible for a list of sub-LUNs (SLs). The routing module 516 receives requests for I/Os from the SAN interface 538, routes them to the designated control modules 512 according to the A2C table 542, and returns the result to the SAN interface 538. The routing module 516 is responsible for maintaining an up-to-date A2C table 542 coordinated with the system-wide management module 532. In a preferred embodiment, it is presupposed that the A2C table 542 balances the range of all possible LXAs between the control modules 512 available in the system 500.

If an I/O operation spans multiple SLs, or multiple control modules 512, the routing module 516 has the responsibility of breaking the I/O operation into multiple smaller independent I/O operations according to the sub LUN unit size (SLUS). Since, in a preferred embodiment, the atomic unit size (AUS) is not larger than the SLUS, as explained in greater detail below, each such I/O is treated as an independent operation throughout the system 500. As will be described in greater detail below, the results may then be aggregated before returning a response to the SAN interface 538.

For write operations, the routing module 516 instructs the calculation of the hash digest for each X-Page by requesting such calculation from the hash module 518.

The control module 512 is responsible for receiving an I/O request from a routing module 516 on a certain SL and distributes the I/O to the data modules 514, guaranteeing its atomic execution, aggregating results if necessary and returning the result to the routing module 516. The control module 512 also communicates with data modules 514 to execute the I/O requests and monitors the disk content of its SLs' logical space by associating each LXA with its hash digest. Importantly, the control module 512 balances the work load between the data modules 514 for the SLs it is maintaining.

The control module 512 maintains an A2H table 544. In certain embodiments, the control module 512 may initiate requests to data modules 514 in order to save A2H table 544 pages to disk and read them from disk. It should be understood that, in certain embodiments, to avoid frequent disk operations, a journal of the latest A2H table operations may be maintained.

The control module 512 also maintains an up-to-date H2D table 546 coordinated with the system-wide management module 532. The H2D table 546 is expected to balance the range of all possible hash digests between the available data modules 514. Similarly, data is balanced between the control modules 512 based on the logical address at the granularity of sub-LUNs.

The data module 514 receives I/O requests from control module 512, performs the requests while supporting deduplication, and returns a result. The data module 514 may perform RDMA read/write operations on memory that resides in other modules, such as routing modules 516 as mentioned above, as part of the I/O operation.

The data module 514 is responsible for maintaining and managing the physical layout of a set of LUNs attached locally, performing all I/O operations on these LUNs, and managing the mapping between X-Page data hash digests and their physical location. Further, the data module 514 manages deduplication of X-Page data and receives disk I/O requests from control modules 512, perform them, and returns a result. For each write operation, the data module 514 backs up the X-Page data in the designated $D_{BACKUP}$ module and performs read-modify operations for writes that are smaller than X-Page size. It should be understood that this process also involves computing a hash digest for these X-Pages.

The data module 514 is further responsible for maintaining an up-to-date H2(D, $D_{BACKUP}$) table coordinated with the system-wide management module 532. The H2(D, $D_{BACKUP}$) table is expected to balance the range of all possible hash digests between the available data modules 514. It should be understood that the data module 514 may not communicate directly with routing modules 516. The only interaction with R modules involves RDMA read/write operations of X-Page Data. Balancing between the data modules 514 is based on hashing of the data.

The data module 514 makes use of a hash digest metadata table which maps each in-use hash digest, representing actual X-Page data, to its meta data information including its physical page on the storage media, its memory copy (if any), a mapping to any backup memory copy, and a reference count for the purpose of deduplication.

The data module 514 allocates a physical page for each X-Page, manages the memory for the physical storage, allocates memory pages for read/write operations, and performs background destaging from memory to storage media when necessary (e.g., when running low on memory). The data module 514 manages a nonvolatile memory pool (e.g., NVRAM or UPS protected) for X-Page data backup purposes which holds X-Pages that are held in memory of the data module 514 and have not yet been destaged. When rebalancing between data modules 514 occurs (e.g., due to a module failure), the data module 514 may communicate with other data modules 514 in order to create new backup copies or move a primary ownership as required.

The data module 514 allows deduplication per X-Page data by maintaining a persistent reference count that guarantees only one copy per X-Page data. The data modules 514 manage the hash digest metadata table which is coordinated with the physical layout for physical pages allocation, the memory pointer, memory backup pointer, and deduplication reference count.

When a write operation smaller than the size of an X-Page is received, the D module may read the entire X-Page to memory and perform partial X-Page modification on that memory. In this case race conditions may occur, for example when two small writes to the same X-Page occur in parallel, and the D module may be required to compute the hash digest of the resulting X-Page. This is discussed in greater detail below.

The hash module 518 calculates the hash function of a given block of data, effectively mapping an input value to a unique output value. The hash function may be based on standards based hash functions such as SHA-1 and MD5, or based on a proprietary function. The hash function is selected to generate a uniformly distributed output over the range of potential input values.

From an architecture perspective, and referring back to FIG. 3, the hash module 518 typically operates on nodes on which a routing module 516 operates; more generally, however, the hash module 518 can reside in certain nodes, in all nodes, together with routing modules 516, or together with control modules 512 or data modules 514.

The following description with respect to FIGS. 6-9 provides high level I/O flows for read, write, and trim. Throughout these flows, unless noted otherwise, control commands are passed between modules using standard remote procedure call (RPC) messaging, while data "pull" operations may use RDMA read. Data push (as well as journal) operations may use RDMA write. The read flow of one X-Page may consist of one routing module which receives the read request from the application, one control module in charge of the address requested and one data module which holds the X-Page to be read. Larger, or unaligned, requests may span several X-Pages and thus may involve several data modules. These requests may also span several SLs, in which case they may involve several control modules as well.

Figure 6:
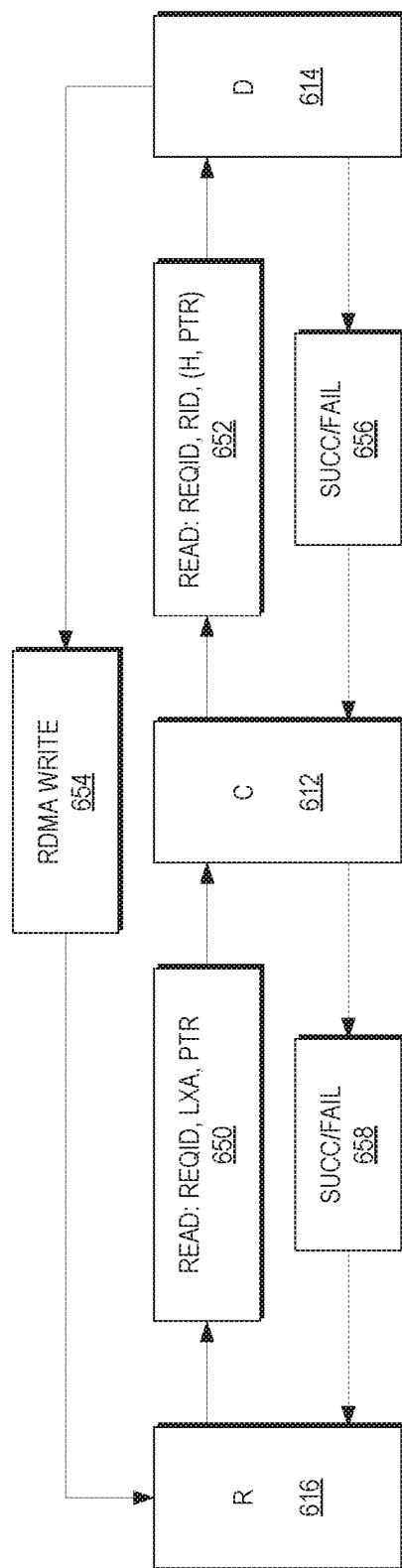
FIG. 6 is a state flow diagram illustrating the operational flow of a read operation for one aligned X-Page according to an example embodiment of the present invention.

FIG. 6 is a flow diagram illustrating a read operation for one aligned X-Page according to an example embodiment of the present invention. As illustrated in FIG. 6, when the routing module 616 receives a read request from an application, the routing module 616 allocates a request identifier (ID) for the operation; translates the LBA to LXA; allocates a buffer for the data to be read; consults the A2C table to determine which control module 612 is in charge of this LXA; and sends the designated control module 612 a read request 650 which includes parameters that include a request ID (REQID), an LXA, and a pointer (PTR) to the allocated buffer.

The control module 612, when receiving the request 650, consults the A2H table, from which it obtains a hash digest representing the X-Page to be read; consults the H2D component to determine which data module 614 holds the X-Page in question; and sends this data module 614 a read request 652 which includes parameters that include a request ID (REQID) (as received from the routing module 616), the hash digest (H), a pointer to the buffer to read to (PTR) (as received from the routing module 616), and an identifier of the routing module 616 (RID).

The data module 614, when receiving the request 652, reads the data of the requested X-Page from SSD and performs an RDMA write 654 to the requesting routing module 616, specifically to the pointer passed to it by the control module 612. The data module 614 then returns a success or failure message 656 to the requesting control module 612 which, in turn, propagates the success or failure message 658 back to the requesting routing module 616, which may then propagate it further to answer the application.

Figure 7:
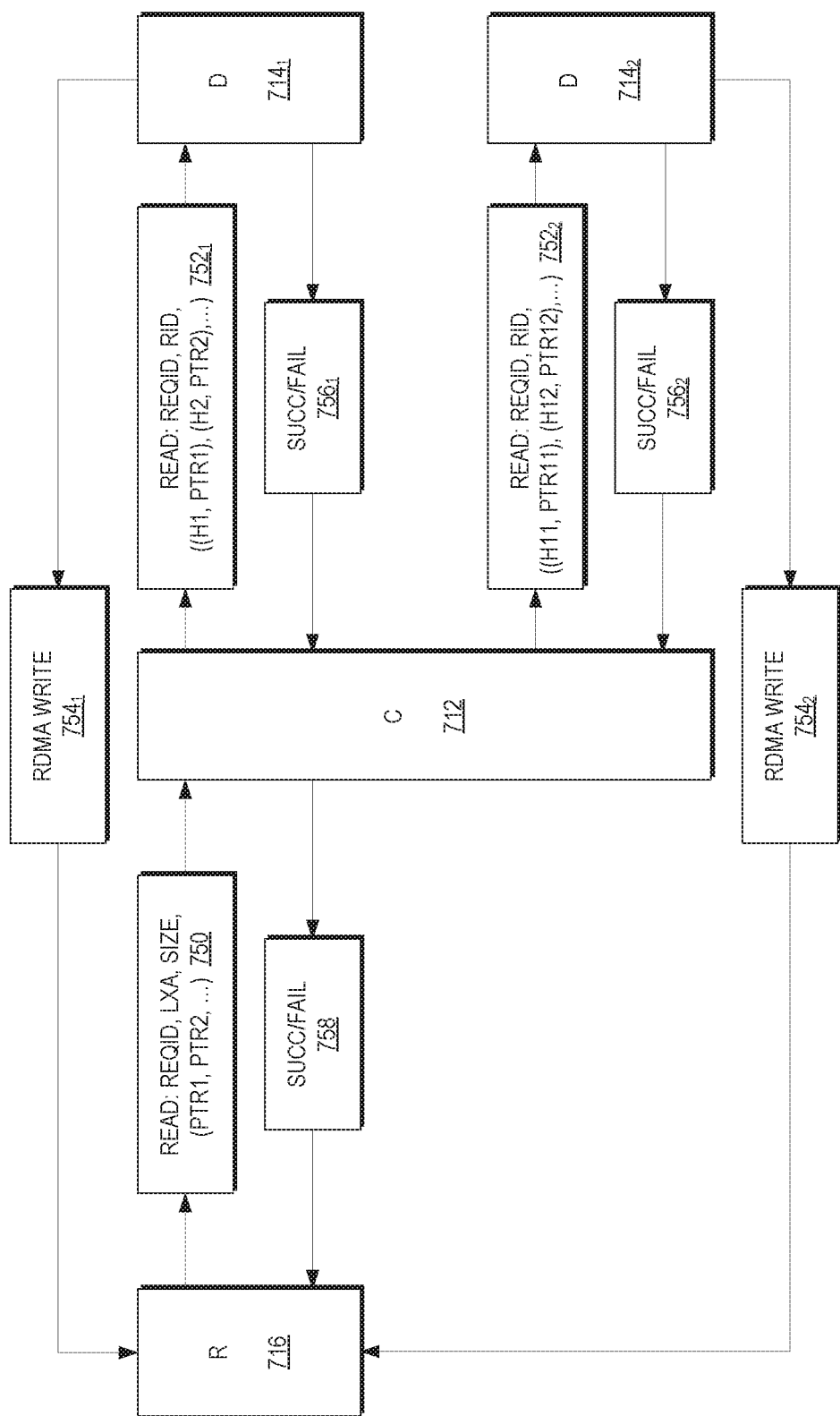
FIG. 7 is a state flow diagram illustrating the operational flow of a read operation for a range of addresses spanning more than one X-Page but only one SL.

FIG. 7 is a flow diagram illustrating a read request from an application spanning more than one X-Page in one SL according to an example embodiment of the present invention. As illustrated in FIG. 7, the routing module 716 sends the designated control module 712 a read command 750 with the parameters that include a request ID (REQID), a first LXA, size of the requested read in X-Pages-n, and n pointers (PTR1-PTRN) to the allocated X-Page buffers. The routing module 716 then operates similarly to that illustrated in FIG. 6 for one X-Page as described above.

The control module 712, when receiving the read request 750, divides the logical address space to LXAs. For each LXA, the control module 712 consults the A2H table to determine the corresponding hash digest; consults the H2D table to determine which data module $714_1$, $714_2$ (714 generally) is responsible for the current LXA; sends each data module 714 a read command $752_1$, $752_2$ (752 generally) containing all the hashes that the respective data module $714_1$, $714_2$ is responsible for. The parameters of the read command include a request ID (REQID) (as received from the routing module 716); a list of respective hash-pointer pairs (e.g., (H1, PTR1)); and the identifier of the routing module 716 (RID). Each data module 714, when receiving its request 752, acts per hash-pointer pair in the same manner to that illustrated in FIG. 6 for one X-Page as described above, including performing RDMA writes $754_1$ and $754_2$ to the requesting routing module 716.

Aggregated success or failure $756_1$, $756_2$ for the sets hash-pointer pairs sent to each data module 714 are then sent to the requesting control module 712 which, in turn, aggregates all the results given to it by the data modules 714 and return success or failure 758 back to the requesting routing module 716, which may then propagate it further to answer the application.

In an embodiment in which a read request spans multiple SLs, similar to that illustrated in FIG. 7, the routing module 716 splits the request and sends several control modules 712 read requests 750. Each control module 712 may receive one request per SL. The flow may continue as in the example illustrated in FIG. 6 except that the routing module 716 performs the additional step of aggregating the responses 758 from the control modules 712 before it answers the application.

Further, read requests smaller than 4 KB, as well as requests not aligned to 4 KB, may be dealt with at the routing module 716 level. For example, for each piece of data (i.e., smaller than 4 KB or not aligned to 4 KB), the routing module 716 may request to read the encompassing X-Page and, upon successful completion of the read command, the routing module 716 may crop the non-relevant sections and return only the requested data to the application.

Figure 8:
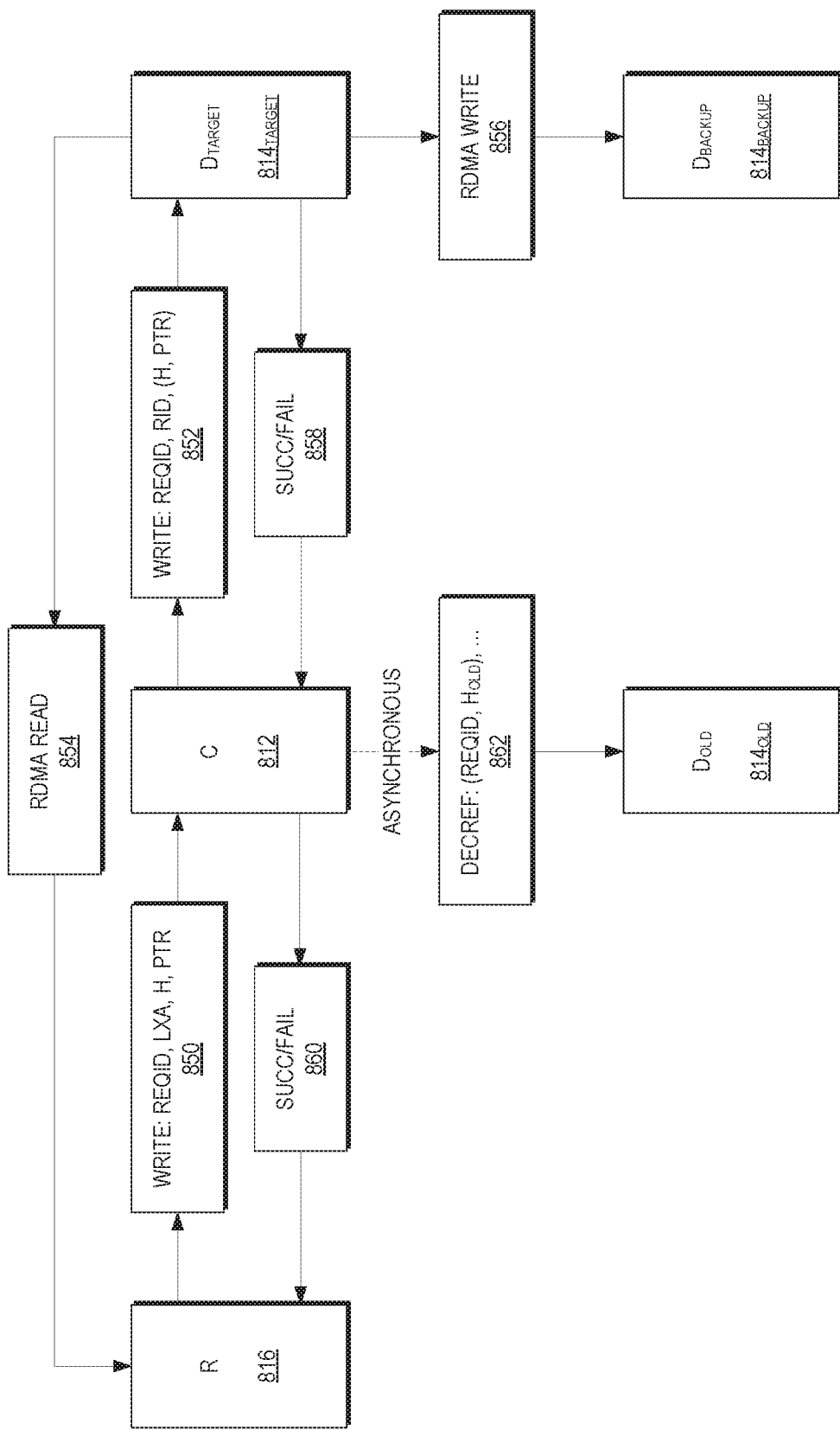
FIG. 8 is a state flow diagram illustrating the operational flow of a write operation for one aligned X-Page according to an example embodiment of the present invention.

FIG. 8 is a flow diagram illustrating the write procedure for a single aligned X page according to an example embodiment of the present invention. As illustrated in FIG. 8, the write flow of one X-Page may consist of one routing module 816 which receives the write request from the application, one control module 812 in charge of the address requested, and three data modules 814: $D_{TARGET}$ $814_{TARGET}$ which is in charge of the X-Page Data to be written (according to its appropriate hash digest); $D_{OLD}$ $814_{OLD}$ which was in charge of the X-Page data this address contained previously ("old" hash digest); and $D_{BACKUP}$ $814_{BACKUP}$ in charge of storing a backup copy of the X-Page data to be written (814 generally).

When a routing module 816 receives a write request from an application, the routing module 816 allocates a request ID for this operation; translates the LBA to an LXA; computes a hash digest on the data to be written; consults its A2C table to determine which control module 812 is in charge of the current LXA; and sends the designated control module 812 a write command 850 with parameters that include a request ID (REQID); an LXA; a hash digest (H); and a pointer (PTR) to the buffer containing the data to be written.

The control module 812, when receiving the request 850, consults its H2D table to understand which data module 814 is in charge of the X-Page to be written ($D_{TARGET}$) $814_{TARGET}$; and sends $D_{TARGET}$ $814_{TARGET}$ a write request 852 with parameters that include the request ID (REQID) (as received from the routing module 816); the hash digest (H) (as received from the routing module 816); the pointer to the data to write (PTR) (as received from the routing module 816); and the identifier of the routing module 816 (RID).

The data module receiving the write command, $D_{TARGET}$ $814_{TARGET}$, may first check if it already holds an X-Page corresponding to this hash and may respond in two ways. First, if $D_{TARGET}$ $814_{TARGET}$ does not have the X-Page, $D_{TARGET}$ $814_{TARGET}$ fetches the data from the routing module 816 using RDMA read 854 and stores it in its memory; consults the H2D component to determine which data module 814 is in charge of storing a backup copy of this X-Page ($D_{BACKUP}$ $814_{BACKUP}$); performs an RDMA write 856 of the X-Page data to the $D_{BACKUP}$ $814_{BACKUP}$ backup memory space; and returns success or failure 858 to the control module 812.

Alternatively, if $D_{TARGET}$ $814_{TARGET}$ has the X-Page, $D_{TARGET}$ $814_{TARGET}$ increases the reference count and returns success or failure 858 to the control module 812. The control module 812 waits for a response from $D_{TARGET}$ $814_{TARGET}$. If a success 858 is returned, the control module 812 updates the A2H table to indicate that the LXA in question should point to the new hash and returns a success or failure response 860 to the requesting routing module 816. If this is not a new entry in the A2H table, the control module 812 asynchronously sends a decrease reference count command 862 to $D_{OLD}$ $814_{OLD}$ (the data module responsible for the hash digest of the previous X-Page data).

These commands may be aggregated at the control module 812 and sent to the data modules 814 in batches. The routing module 816 then may answer the application once it receives a response from the control module 812.

Figure 9:
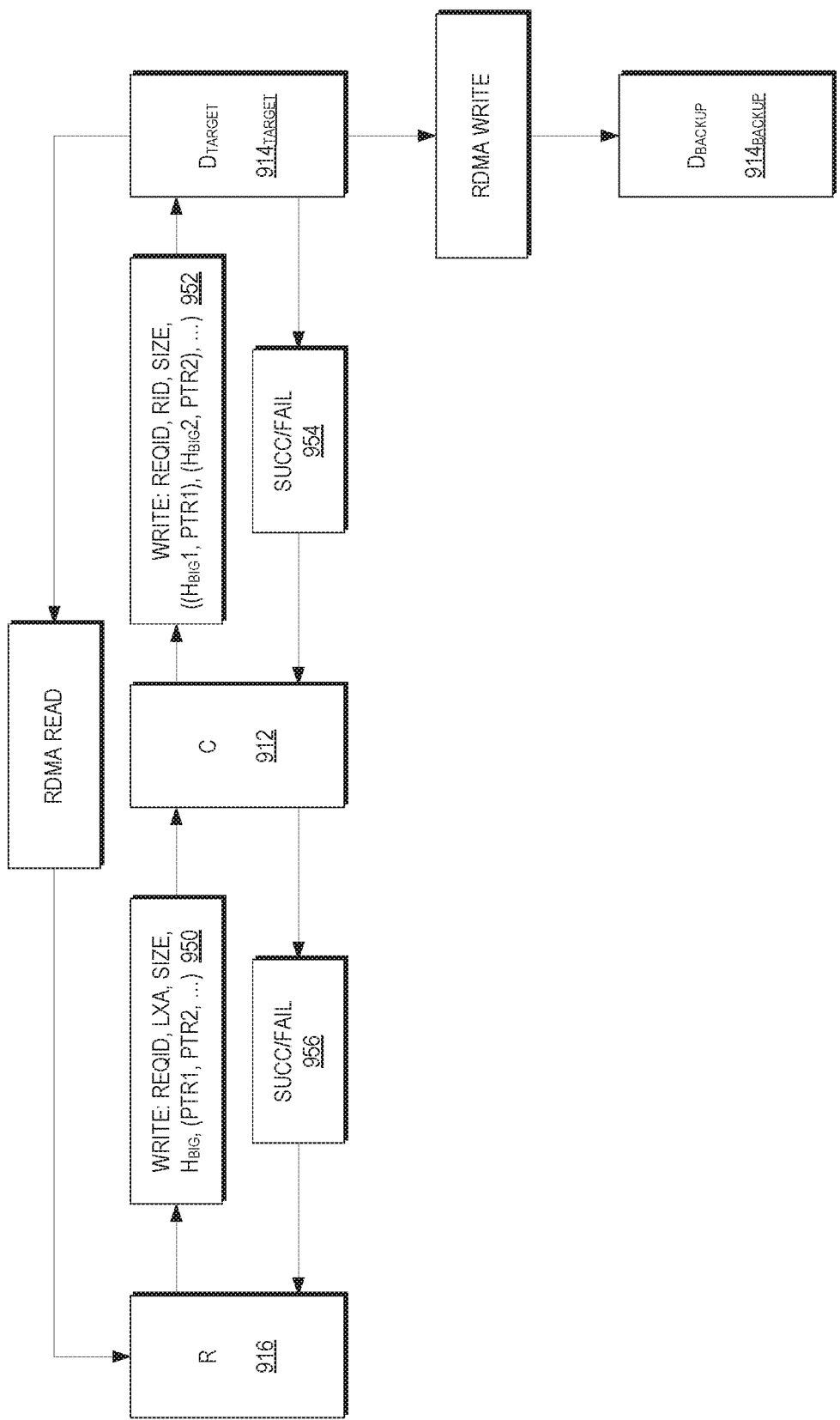
FIG. 9 is a state flow diagram illustrating the operational flow of a write operation for a range of addresses spanning more than one X-Page according to an example embodiment of the present invention.

FIG. 9 is a flow diagram illustrating the process for writes to multiple full X-Pages according to an example embodiment of the present invention. In the case that the write request spans a range of addresses which includes more than one X-Page but only one SL, the routing module 916 sends the designated control module 912 a write command 950 with parameters that include a request ID (REQID): a first LXA; a size of the requested write in LXAs-n; and $H_{BIG}$ which is a unique identifier of the entire chunk of data to be written. $H_{BIG}$ may be a computed hash digest and thus equal for two identical chunks of data. Additional parameters sent with the write command are n pointers (PTR) that point to the buffers which hold the data to be written. The rest of the routing module 916 treatment is the same as for the aligned one X-Page embodiment of FIG. 8.

The control module 912, when receiving the request 950, consults its H2D table to determine which data module $D_{TARGET}$ $914_{TARGET}$ is in charge of $H_{BIG}$ and generates a hash digest per pointer (($H_{BIG}1$, PTR1), ($H_{BIG}2$, PTR2), etc.) by replacing one byte of $H_{BIG}$ with the offset of that pointer. It is noted that, in a preferred embodiment, this byte does not collide with the bytes used by the H2D table distribution. The control module 912 then may send $D_{TARGET}$ $914_{TARGET}$ a write request 952 with parameters including the request ID (REQID) (as received from the routing module 916); a list of respective hash-pointer pairs (($H_{BIG}1$, PTR1), ($H_{BIG}2$, PTR2), etc.); and the identifier of the routing module 916 (RID). The data module 914, when receiving the request 952, acts per hash-pointer pair in the same manner as described above with respect to FIG. 8 for one X-Page.

An aggregated success or failure response 954 is then sent to the requesting control module 912. The control module 912 waits for a response 954 from $D_{TARGET}$ $914_{TARGET}$. If the response 954 indicates success, the control module 912 updates its A2H table to indicate that the LXAs in question should point to the new hashes. Updating of entries in the A2H table may be done as an atomic operation to ensure the write request is atomic. Note that requests aligned to 4 KB (or another predefined block size) that fall within a SL may be atomic. The control module 912 then returns a response 956 to the requesting routing module 916. The control module 912 then adds the list of old hashes to the "decrease reference" batch if needed. The routing module 916 then answers the application once it receives a response from the control module 912.

In the case in which a write request spans multiple SLs, the routing module 916 splits the request and sends smaller write requests 950 to several control modules 912. Each control module 912 receives one request per SL (with a unique request ID (REQID)). The flow continues as described above with respect to FIG. 9 except that the routing module 916 aggregates the responses 956 before it answers the application.

Efficient Repurposing and Efficient Local Data Protection of Application Data in Storage Environments In general, critical business processes require multiple copies of database and application data for purposes such as development, analytics, operations, and data protection. To improve organizational agility and competitiveness, more is better—more copies, more frequently, with more operational self-service across the process cycles. Organizations have relied on brute force copies with storage tiering, snapshots, and dedicated copy management tools, for managing the creation and maintenance of copies. This generally is referred to in the industry as copy data management (CDM).

Traditional CDM approaches struggle fundamentally with storage sprawl, performance/scalability and service-level agreement (SLA) issues, limitations on copy frequency, and complex operational processes. Traditional CDM methodologies result in expensive, slow, and complex copy management operations, which do not meet the needs of business. Therefore, information technology administrators are faced with the following challenges:

Bloated copies—A copy consumes the same amount of storage as the original instance, creating redundancy and large amounts of storage sprawl, risky SLAs, and high costs;

Insufficient copies—The cost and performance overhead and sub-optimal SLAs of making copies mean organizations can rarely meet copy demands of internal groups;

Handicapped copies—Non-production business processes experience poor copy performance, as they are too expensive to put on Tier-1 storage. Thus, slow copies result in slower development cycles and lower quality code, when deployed at scale;

Painful copy creation and management—Copies made with brute force read/write techniques put a high load on underlying infrastructures. In addition, agile workflow elements, like self-service copies, copy scheduling, and refresh/promotion are practically impossible;

Stale copies—Once created, copies immediately go out of sync with the main application. The complexity and performance impact of creating copies mean that their data is rarely refreshed to match the production instance; and Compromised business process workflows—As a result of these difficulties, organizations have built their processes around their infrastructure's copy limitations, thus limiting their own competitiveness and agility.

Example embodiments of the present invention, however, relate to the concept of integrated copy data management (iCDM), such as the feature provided by XtremIO all-flash arrays by EMC Corporation of Hopkinton, Mass. Beneficially, iCDM provides the ability to consolidate both primary data and its associated copies on the same storage array. Accordingly, example embodiments of the present invention leverage virtual copies which abstract the copy operations as an in-memory metadata operation with no back-end media or network impact thereby allowing instant, high performance copies of data, in nearly any quantity desired, in a space-efficient manner, with data services (e.g., inline deduplication and compression), and with no impact on production or other copies. Copies are immediately useable by the application, enabling fast deployments and ensuring that those deployed copies are fully functional:

Development: For development and testing, example embodiments of the present invention enable making a development copy on-demand from production and refreshing the output back into production, all leveraging the fresh copies of production data.

Analytics: For analytics, production data can be extracted and pushed to downstream analytics applications on-demand, as a simple in-memory operation. Copies are high performance and can get the same SLAs as production without risking the production SLA.

Operations: For the application team operations (e.g., patches, upgrades, and tuning), copies can be made instantly for tasks such as fast diagnosis of application/database performance problems, testing and validating patching processes, validating and applying tuning, or testing new technologies and infrastructure options for databases.

Data Protection: Virtual copies enable the creation of a large number of copies at low interval points-in-time for recovery. Point-in-time copies can be used for recovery when needed or can be leveraged for other purposes. Application integration and orchestration policies can be set to auto-manage data protection, using different SLAs.

To create virtual copies, example embodiments of the present invention create snapshots of the production data. For example, snapshots may be created as described in U.S. Pat. No. 9,141,290 entitled "SNAPSHOT MECHANISM" issued on Sep. 22, 2015, commonly assigned with the present application to EMC Corporation of Hopkinton, Mass., and incorporated herein by reference in its entirety. As understood in the art, and in certain embodiments of the present invention, a snapshot (i.e., zero time copy) provides an instantaneous copy of a logical volume and may be used for various purposes, including taking copies for backups across different points in time, as well as using multiple copies of a database for different uses (e.g., production, development, testing, different copies for different users, copies for users of virtual machines, disaster recovery, etc.). For example, in some embodiments, writable snapshots (i.e., clones) may be used in a virtualization infrastructure as multiple images of virtual machines. Likewise, in other embodiments, snapshots may be used as the internal mechanism to implement asynchronous replication between storage arrays or local data protection.

Traditional snapshot implementations may be varied and may be roughly categorized according to: (i) read-only vs. writable, (ii) data space efficiency, (iii) metadata space efficiency, (iv) hierarchies and restrictions, and (v) performance. The following briefly considers each of the above-listed traditional parameters and various implementations thereof.

Read-only snapshots typically are used for purposes such as backup as they cannot be written to and thus do not change. In contrast, writable snapshots, however, can be read from and written to similar to ordinary volumes.

From the point of data efficiency, in general, two types of solutions may exist. The first generally is not data space efficient and the snapshot uses up space according to the address space of the volume from which it was taken, regardless of the number of writes performed to it or to its ancestor volume. In contrast, the second generally is data space efficient and only subsequent writes to the snapshot or its ancestor volume may take up space. However, depending on the granularity of the snapshot, each subsequent write to a new address range will use up space equal to the granularity even if an amount of data less than the granularity were actually written. Thus, data space efficient snapshots can be further divided into rough granularity and fine granularity variants.

Regarding metadata space efficiency, where metadata may be interpreted as auxiliary data structures (e.g., mapping tables) used by the snapshot mechanism, snapshot configuration may depend on the amount of metadata needed per snapshot. For example, it may be important to be metadata space-efficient with regard to short-lived snapshots because relatively few writes typically are made to these snapshots and to their ancestor volume during their lifetime; in other words, the metadata may often take more space than the data, itself. This also may be true in thinly provisioned memory systems and in systems which employ a data deduplication mechanism. It should be understood that metadata space efficiency has several possible levels. Most systems consume metadata in accordance with the address size of the original volume. Thinly provisioned systems may consume metadata in accordance with the amount of data previously written to the original volume, which may be wasteful because both the original volume and the snapshot share this data until pieces of it are changed in one of them.

Regarding hierarchies and restriction (e.g., the number of snapshots, the times in which snapshots can be taken or removed, and the volumes/snapshots from which they can be taken), there may be various levels of leniency. For example, a most restrictive form allows each volume to have a single snapshot taken at any given point in time. Further, for example, a more lenient form allows several snapshots (e.g., up to some limit) to be taken on the same volume only after various time intervals have elapsed from the last snapshot taken. Moreover, for example, an even more lenient form allows snapshots to be taken on writable snapshots. It should be understood that, typically, most systems have limits on the number of snapshots and the amount of space snapshots may consume.

Regarding performance (e.g., read/write performance and create/delete performance), read performance typically depends on the number of reads from disk needed to retrieve a piece of data. Write performance, however, may not be as straight forward and typically depends on the number of operations which must be performed per user write. For example, popular approaches include "copy on write" which requires two writes and one read per user write and "redirect on write" which requires only one write but depends on the granularity of the mechanism. For example, if the granularity of the mapping table is 1 MB (i.e., each megabyte has a single pointer to a physical data location), a 4 KB user write will still require extra writes and reads to be performed in order to copy the 1 MB of data encompassing the 4 KB block to the newly chosen location.

Regarding creation and deletion of snapshots, there also may be various efficiency levels. Creation of snapshots, while instantaneous, may include prolonged asynchronous procedures which depend on the address space of the original volume or on the amount of data previously written to the original volume. For example, a snapshot may be taken of a specific address range at a point in time and provide a duplicate of the address range (i.e., fully provisioned or thinly provisioned) by inheriting the mappings of the address range and it may overwrite mappings and diverge from the source range or volume. Snapshot deletion efficiency is typically a function of the data and metadata efficiencies since all data and metadata is typically deleted. For example, in most cases, this requires going over metadata in accordance with the address space of the snapshot or even the aggregated address space of all snapshots of the ancestor volume. Often, a prolonged snapshot deletion process delays the creation of new snapshots, due to a limit on the number of snapshots or a limit on the amount of space available. This delay may significantly increase the Recovery Point Objective (RPO) when using snapshots to implement asynchronous replication.

In many traditional storage arrays, creating snapshots involves a source volume and a target volume or snapshot which is either pre-defined or created automatically. Typically, creating a volume on such storage arrays could take seconds or minutes and, when used for a snapshot, the volume will contain pointers to the data represented by the point in time of the snapshot. When it is time to do a restore operation on such traditional storage arrays, a common technique is to have the data from that point in time copied back to the source volume, with access to that data during copying provided through the snapshot's pointer. In other words, a typical restore is a copy from a volume which holds snapshot data back to the original volume.

FIGS. 10A-12B are block diagrams and flow diagrams, respectively, of snapshot operations according to example embodiments of the present invention. Snapshot operations may include (1) create a snapshot from a device (FIGS. 10A-10B), (2) refresh a snapshot from a device (FIGS. 11A-11B), (3) and restore a snapshot from a snapshot (FIGS. 12A-12B).

Figure 10B:
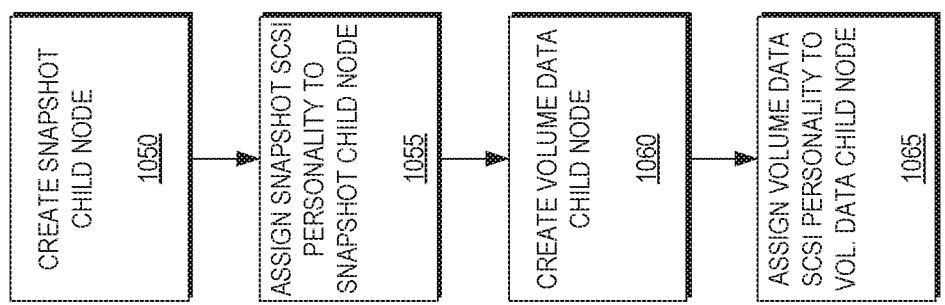
FIGS. 10A and 10B are a block diagram and a flow diagram, respectively, of a snapshot operation to create a snapshot from a volume device according to an example embodiment of the present invention.
Figure 10A:
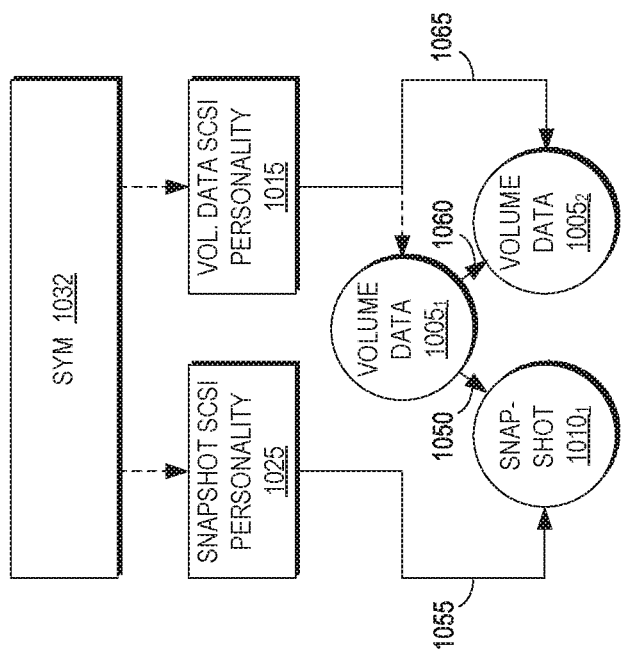

FIGS. 10A and 10B are a block diagram and a flow diagram, respectively, of a snapshot operation to create a snapshot from a volume device according to an example embodiment of the present invention and may be described in conjunction. In example embodiments of the present invention, snapshot creation is instantaneous with metadata stored in memory. Accordingly, in an initial state, there is a volume data node $1005_1$ with a SCSI personality $1015$ pointing to the volume data node $1005_1$. As illustrated in FIGS. 10A and 10B, the system-wide management module $1032$ may create a snapshot child node $1010_1$ ($1050$) and assign a snapshot SCSI personality $1025$ to the snapshot child node $1010_1$ ($1055$). The system-wide management module $1032$ then may create a second volume data node $1005_2$ from the volume data node $1005_1$ ($1060$) and move the volume data SCSI personality $1015$ from the parent volume data node $1005_1$ to the second volume data node $1005_2$ ($1065$). In other words, the snapshot $1010_1$ is assigned a SCSI personality representative of the volume $1005_1$ so that storage hosts will see the snapshot $1010_1$ as the volume $1005_1$ which state is preserved by the creation of the second volume data node $1005_2$.

Accordingly, when the system-wide management module $1032$ creates a snapshot $1010_1$ of the volume data $1005_1$ (i.e., device), there are two entities created: (1) a snapshot $1010_1$ which is a version of the volume data $1005_1$ (i.e., a writable snapshot that points to the volume), and (2) a volume data node $1005_2$ which is assigned the SCSI personality $1015$. Therefore, the second volume data node $1005_2$ can get new changes to the volume $1005_1$ which now becomes fixed (i.e., when a snapshot is taken, the snapshot node and the new volume data node are created and the original becomes fixed with no more changes). It should be understood that the parent volume data node $1005_1$ is the same as the data in the snapshot $1010_1$ before any I/O operations are performed on it. The second volume data node $1005_2$ is assigned the SCSI personality so it receives the I/Os from a host. Therefore, the host may perform production I/O operations to the second volume data node $1005_2$ and nonproduction I/Os from may be performed on the snapshot $1010_1$.

Figure 11B:
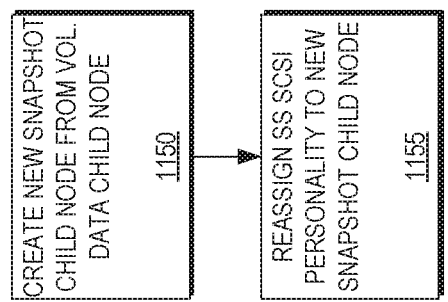
FIGS. 11A and 11B are a block diagram and a flow diagram, respectively, of a snapshot operation to refresh a snapshot from a volume device according to an example embodiment of the present invention.
Figure 11A:
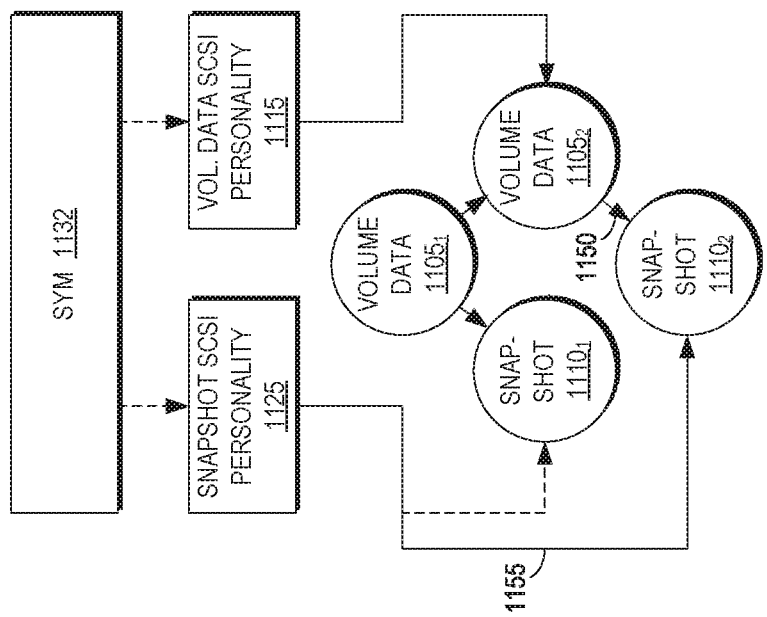

FIGS. 11A and 11B are a block diagram and a flow diagram, respectively, of a snapshot operation to refresh a snapshot from a volume device according to an example embodiment of the present invention and may be described in conjunction. In an initial state, there is a first volume data node $1105_1$ having two child nodes: a first snapshot node $1110_1$ with the snapshot SCSI personality $1125$ pointing to the first snapshot node $1110_1$ and a second volume data node $1105_2$ with the volume data SCSI personality $1115$ pointing to the second volume data node $1105_2$ (similar to the arrangement of nodes created in FIGS. 10A and 10B above).

From the storage array perspective, rather than actually refreshing the existing snapshot $1110_1$, which would require copying (at least) metadata within the array, similar to the creation of a snapshot as described above with reference to FIGS. 10A and 10B, to refresh a snapshot from a device, a new snapshot child node $1110_2$ is created (illustratively by system-wide management module $1132$) from the volume data child node $1105_2$ ($1150$) and the snapshot SCSI personality $1125$ is then reassigned to the new snapshot child node $1110_2$ ($1155$). Therefore, the first snapshot node $1110_1$ is frozen at the time of the creation of the second snapshot node $1110_2$ and the snapshot SCSI personality $1125$ is moved to the second snapshot node $1110_2$ for performing nonproduction operations. As illustrated in FIG. 11A, the snapshot SCSI personality $1125$ for the original snapshot $1110_1$ is represented by a dashed line and the snapshot SCSI personality $1125$ for the new snapshot $1110_2$ is represented by a solid line.

From a storage host perspective, a refresh operation results in the contents of the volume (i.e., snapshot) that is being refreshed (e.g., the initial snapshot $1110_1$) being instantly updated with the content of the volume from which it is being refreshed (e.g., the volume $1105_2$). The speed of the operation also means that there's no need for blocking access to the LUN during the refresh; however, from an application perspective there still may be a need to stop accessing the LUN while the data changes (e.g., stopping applications, unmounting filesystems, exporting disk groups, etc.). It should be understood that this operation is completely transparent to the host so there's no need to rescan disks, etc.; however, when the storage host makes a nonproduction request to the LUN, the storage array directs the request to the newly created snapshot volume $1110_2$. Further, it should be understood that, in some situations, it may be desirable to keep the pre-refresh copy of the data (e.g., the original snapshot $1110_1$) (i.e., as a "backup" copy of that data).

FIGS. 12A and 12B are a block diagram and a flow diagram, respectively, of a snapshot operation to restore a snapshot from another snapshot according to an example embodiment of the present invention and may be described in conjunction. In an initial state, there is a first volume data node $1205_1$ having two child nodes: a first snapshot node $1210_1$ with the snapshot SCSI personality $1225$ pointing to the first snapshot node $1210_1$ and a second volume data node $1205_2$ with the volume data SCSI personality $1215$ pointing to the second volume data node $1205_2$ (similar to the arrangement of nodes created in FIGS. 10A and 10B above).

As a result of the instantaneous snapshot creation in example embodiments of the present invention, rather than running a copy operation to restore data from the current snapshot $1210_2$ to the intermediate snapshot $1210_1$ as in a traditional storage array, example embodiments of the present invention create a new snapshot $1210_2$ of the node (illustratively by system-wide management module $1232$) associated with the desired point-in-time (e.g., the intermediate snapshot $1210_1$) ($1250$) and reassign the snapshot SCSI personality $1225$ to the new snapshot child node $1210_2$ ($1255$). Therefore, the first snapshot node $1210_1$ is frozen at the time of the creation of the second snapshot node $1210_2$ and the snapshot SCSI personality $1225$ is reassigned to the second snapshot node $1210_2$ for performing nonproduction operations, as will be described in greater detail below. As illustrated in FIG. 12A, the snapshot SCSI personality $1225$ for the original snapshot $1210_1$ is represented by a dashed line and the snapshot SCSI personality $1225$ for the new snapshot $1210_2$ is represented by a solid line.

In certain embodiments, a restore is a deliberately-constrained version of a refresh: (1) a restore allows refreshing from a direct child volume, and only when that child is a read-only volume; and (2) a restore is intended to be used when restoring a volume (i.e., snapshot) from a known-good, unmodified, backup-style copy of the parent volume. A restore may be functionally equivalent to a refresh;

however, it may only be available as an option when a read-only child copy exists. In the event that a restore cannot be performed (e.g., the snapshot from which you want to restore is read-write), a refresh operation may be performed; however, there will be no guarantee that the data on that volume (i.e., snapshot) is an exact copy of the original volume data.

FIGS. 13A and 13B are a block diagram and a flow diagram, respectively, of a snapshot operation to promote a snapshot and take a snapshot and reassign the SCSI personality according to an example embodiment of the present invention and may be described in conjunction. In an initial state, there is a first volume data node $1305_1$ having two child nodes, a first snapshot node $1310_1$ and a second volume data node $1305_2$ having the volume data SCSI personality 1315 pointing to the second volume data node $1305_2$, with the first snapshot node $1310_1$ having a second snapshot node $1310_2$ with the snapshot SCSI personality 1325 pointing to the second snapshot node $1310_2$ (similar to the arrangement of nodes created in FIGS. 10A and 10B above).

As illustrated in FIGS. 13A and 13B, the system-wide management module 1332 creates a third volume data node $1305_3$ as a child node of the first snapshot node $1310_1$ (1350) and reassigns the volume data SCSI personality 1315 from the second volume data node $1305_2$ to the third volume data node $1305_3$ (1355). Therefore, the system may continue to perform nonproduction operations to the second snapshot node $1310_2$ and may perform production operations at the point in time represented by the first snapshot node $1310_1$ via the third volume data node $1305_3$. In a preferred embodiment, the third volume data node $1305_3$ is empty and points to the frozen data in the first snapshot node $1310_1$. Accordingly, the third volume data node $1305_3$ has the volume data SCSI personality 1315 of the nonproduction snapshot device which may continue to be updated by updating the snapshot node assigned snapshot SCSI personality 1325 (here the second snapshot node $1310_2$).

Figure 14:
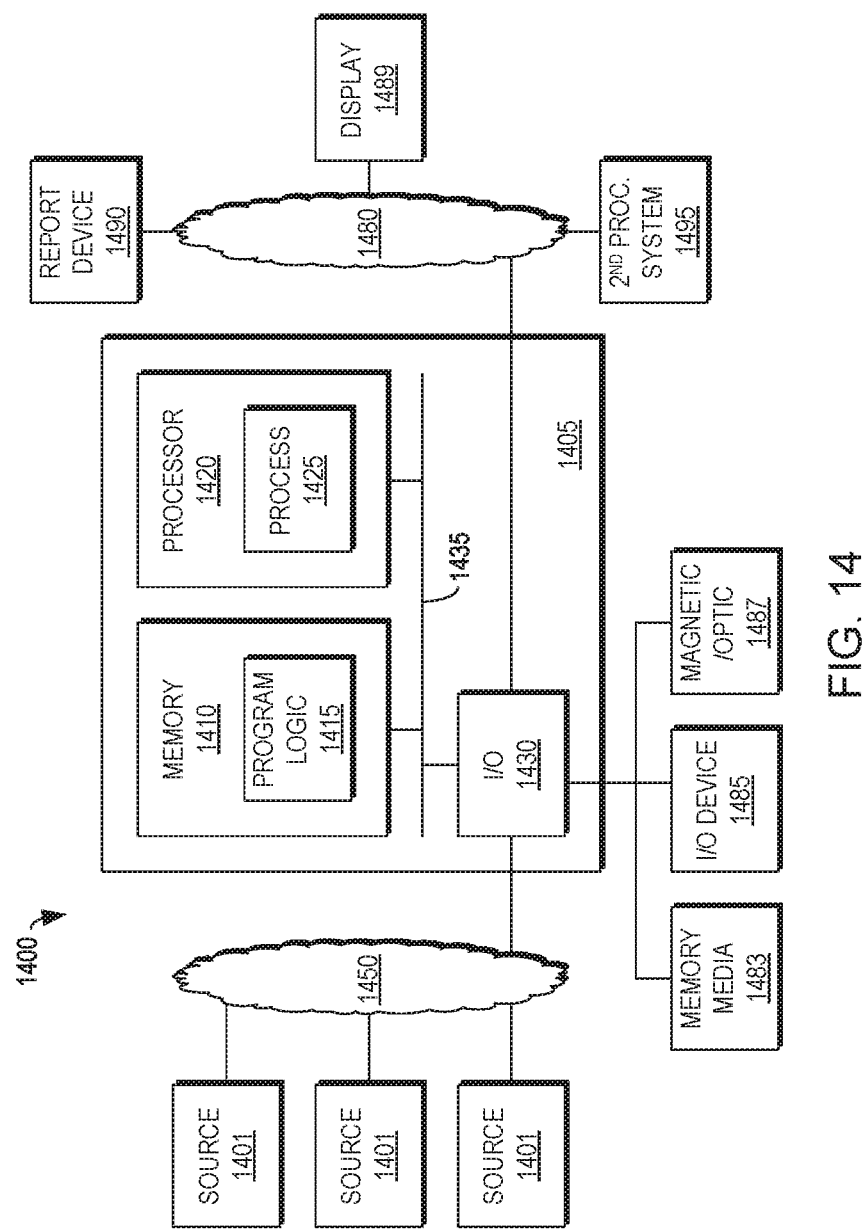
FIG. 14 is a block diagram illustrating an apparatus according to an example embodiment of the present invention.

FIG. 14 is a block diagram of an example embodiment apparatus 1405 according to the present invention. The apparatus 1405 may be part of a system 1400 and includes memory 1410 storing program logic 1415, a processor 1420 for executing a process 1425, and a communications I/O interface 1430, connected via a bus 1435. The I/O interface 1430 provides connectivity to memory media 1483, I/O device 1485, and drives 1487, such as magnetic or optical drives. The apparatus 1405 is configured to communicate with a plurality of sources 1401 via a network 1450 using the I/O interface 1430. The apparatus 1405 is further configured to communicate with a display 1489, a report device 1490, and a second processing system 1495 via a network 1480 using the I/O interface 1430. The exemplary apparatus 1405 is discussed only for illustrative purpose and should not be construed as a limitation on the embodiments or scope of the present disclosure. In some cases, some devices may be added to or removed from a computer system based on specific situations. For example, a computer system may be representative of a standalone system or a system of a production site, which comprises a number of hosts coupled to a source disk and a target disk. In most embodiments, a system/device may comprise a processor and a memory, such as a laptop computer, personal digital assistant, or mobile phones.

Processing may be implemented in hardware, software, or a combination of the two. Processing may be implemented in computer programs executed on programmable computers/machines that each includes a processor, a storage medium or other article of manufacture that is readable by the processor (including volatile and non-volatile memory and/or storage elements), at least one input device, and one or more output devices. Program code may be applied to data entered using an input device to perform processing and to generate output information.

In some embodiments, the system may be performed by one or more programmable processors executing one or more computer programs to perform the functions of the system. In some other embodiments, all or part of the system may be implemented as special purpose logic circuitry (e.g., a field-programmable gate array (FPGA) and/or an application-specific integrated circuit (ASIC)). In some other embodiments, all or part of the system may be implemented using electronic hardware circuitry that include electronic devices such as, for example, at least one of a processor, a memory, a programmable logic device or a logic gate.

In one embodiment, the methods described herein are not limited to the specific examples described. In a further embodiment, rather, any of the method steps may be re-ordered, combined or removed, or performed in parallel or in serial, as necessary, to achieve the results set forth above.

In some embodiments, the system may be implemented, at least in part, via a computer program product, (e.g., in a non-transitory machine-readable storage medium such as, for example, a non-transitory computer-readable medium), for execution by, or to control the operation of, data processing apparatus (e.g., a programmable processor, a computer, or multiple computers). In certain embodiments, each such program may be implemented in a high level procedural or object-oriented programming language to communicate with a computer system. In certain other embodiments, however, the programs may be implemented in assembly or machine language. In some embodiments, the language may be a compiled or an interpreted language and it may be deployed in any form, including as a stand-alone program or as a module, component, subroutine, or other unit suitable for use in a computing environment. In some other embodiments, a computer program may be deployed to be executed on one computer or on multiple computers at one site or distributed across multiple sites and interconnected by a communication network.

The methods and apparatus of this invention may take the form, at least partially, of program code (i.e., instructions) embodied in tangible non-transitory media, such as floppy diskettes, CD-ROMs, hard drives, random access or read only-memory, or any other machine-readable storage medium. When the program code is loaded into and executed by a machine, such as the computer of FIG. 14, the machine becomes an apparatus for practicing the invention. When implemented on one or more general-purpose processors, the program code combines with such a processor to provide a unique apparatus that operates analogously to specific logic circuits. As such, a general purpose digital machine can be transformed into a special purpose digital machine. In some other embodiment, a non-transitory machine-readable medium may include but is not limited to a hard drive, compact disc, flash memory, non-volatile memory, volatile memory, magnetic diskette and so forth but does not include a transitory signal per se.

Figure 15:
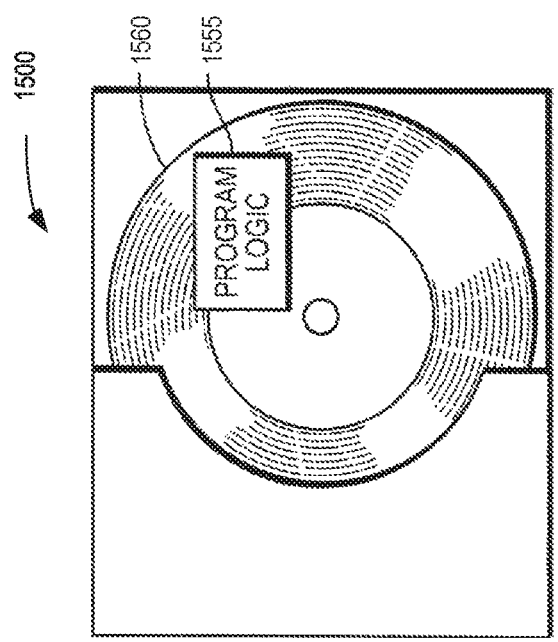
FIG. 15 is an illustration of an example embodiment of the present invention embodied in computer program code.

FIG. 15 is a block diagram of a computer program product 1500 including program logic 1555, encoded on a computer-readable medium 1560 in computer-executable code configured for carrying out the methods of the invention, according to an example embodiment of the present invention. The logic for carrying out the method may be embodied as part of the aforementioned system, which is useful for carrying out a method described with reference to embodiments shown. In one embodiment, program logic 1555 may be loaded into memory and executed by a processor. In a further embodiment, program logic 1555 may also be the same program logic 1555 on a computer readable medium.

Various exemplary embodiments of the present disclosure have been described with reference to the accompanying drawings. It should be noted that all of these drawings and description are only presented as exemplary embodiments. It is to note that based on the subsequent description, alternative embodiments may be conceived that may have a structure and method disclosed as herein, and such alternative embodiments may be used without departing from the principle of the disclosure as claimed in the present disclosure.

It may be appreciated that these exemplary embodiments are provided only for enabling those skilled in the art to better understand and then further implement the present disclosure, not intended to limit the scope of the present disclosure in any manner. Besides, in the drawings, for a purpose of illustration, optional steps, modules, and units are illustrated in dotted-line blocks.

The terms "comprise(s)," "include(s)", their derivatives and like expressions used herein should be understood to be open, i.e., "comprising/including, but not limited to". The term "based on" means "at least in part based on". The term "one embodiment" means "at least one embodiment"; and the term "another embodiment" indicates "at least one further embodiment". Reference to a "computer" may be a physical computer or a virtual computer (i.e., virtual machine). Relevant definitions of other terms have been provided in this description.

It may be noted that the flowcharts and block diagrams in the figures may illustrate the apparatus, method, as well as architecture, functions and operations executable by a computer program product according to various embodiments of the present disclosure. In this regard, each block in the flowcharts or block diagrams may represent a module, a program segment, or a part of code, which may contain one or more executable instructions for performing specified logic functions. It should be further noted that in some alternative implementations, functions indicated in blocks may occur in an order differing from the order as illustrated in the figures. For example, two blocks shown consecutively may be performed in parallel substantially or in an inverse order sometimes, which depends on the functions involved. It should be further noted that each block and a combination of blocks in the block diagrams or flowcharts may be implemented by a dedicated, hardware-based system for performing specified functions or operations or by a combination of dedicated hardware and computer instructions.

Although the foregoing invention has been described in some detail for purposes of clarity of understanding, it will be apparent that certain changes and modifications may be practiced within the scope of the appended claims. The scope of the invention is limited only by the claims and the invention encompasses numerous alternatives, modifications, and equivalents. Numerous specific details are set forth in the above description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured. Accordingly, the above implementations are to be considered as illustrative and not restrictive, and the invention is not to be limited to the details given herein, but may be modified within the scope and equivalents of the appended claims.

What is claimed is:

1. A method comprising:
   creating a snapshot of a volume in an in-memory operation on a storage array; and
   maintaining the snapshot as a logical point in time copy of the volume for data protection of the volume;
   wherein the volume is represented as a first volume data node in conjunction with creation of the snapshot;
   wherein changes to the volume made subsequent to creation of the snapshot are captured in a second volume data node;
   wherein an additional snapshot is created from the second volume data node in an additional in-memory operation on the storage array; and
   wherein in conjunction with the creation of the additional snapshot from the second volume data node, a storage protocol personality of the snapshot created from the volume represented as the first volume data node is reassigned to the additional snapshot.

2. The method of claim 1 wherein maintaining the snapshot as a logical point in time copy of the volume for data protection of the volume comprises maintaining the point in time copy of the volume with no additional storage overhead for the point in time copy of the volume.

3. The method of claim 1 further comprising recovering the volume at the point in time.

4. The method of claim 3 wherein recovering the volume at the point in time comprises:
   creating a new snapshot of the point in time copy snapshot; and
   assigning the SCSI personality of the volume to the new snapshot.

5. The method of claim 3 further comprising updating an external volume ID in a mapping of offsets and external volume ID.

6. The method of claim 4 further comprising retaining the point in time copy of the volume snapshot for data protection.

7. The method of claim 1 further comprising:
   representing the volume as the first volume data node in a tree of nodes; and
   representing the snapshot as a child node of the first volume data node.

8. A system comprising:
   one or more processors; and
   memory storing computer program code that when executed on the one or more processors causes the system to perform the operations of:
   creating a snapshot of a volume in an in-memory operation on a storage array; and
   maintaining the snapshot as a logical point in time copy of the volume for data protection of the volume;
   wherein the volume is represented as a first volume data node in conjunction with creation of the snapshot;
   wherein changes to the volume made subsequent to creation of the snapshot are captured in a second volume data node;
   wherein an additional snapshot is created from the second volume data node in an additional in-memory operation on the storage array; and
   wherein in conjunction with the creation of the additional snapshot from the second volume data node, a storage protocol personality of the snapshot created from the volume represented as the first volume data node is reassigned to the additional snapshot.

9. The system of claim 8 wherein the memory further stores computer program code that when executed on the one or more processors causes the system to perform the operation of maintaining the point in time copy of the volume with no additional storage overhead for the point in time copy of the volume.

10. The system of claim 8 wherein the memory further stores computer program code that when executed on the one or more processors causes the system to perform the operation of recovering the volume at the point in time.

11. The system of claim 10 wherein the memory further stores computer program code that when executed on the one or more processors causes the system to perform the operations of:
creating a new snapshot of the point in time copy snapshot; and
assigning the SCSI personality of the volume to the new snapshot.

12. The system of claim 10 wherein the memory further stores computer program code that when executed on the one or more processors causes the system to perform the operation of updating an external volume ID in a mapping of offsets and external volume ID.

13. The system of claim 11 wherein the memory further stores computer program code that when executed on the one or more processors causes the system to perform the operation of retaining the point in time copy of the volume snapshot for data protection.

14. The system of claim 8 wherein the memory further stores computer program code that when executed on the one or more processors causes the system to perform the operations of:
representing the volume as the first volume data node in a tree of nodes; and
representing the snapshot as a child node of the first volume data node.

15. A computer program product including a non-transitory computer readable storage medium having computer program code encoded thereon comprising:
computer program code for creating a snapshot of a volume in an in-memory operation on a storage array; and
computer program code for maintaining the snapshot as a logical point in time copy of the volume for data protection of the volume;
wherein the volume is represented as a first volume data node in conjunction with creation of the snapshot;
wherein changes to the volume made subsequent to creation of the snapshot are captured in a second volume data node;
wherein an additional snapshot is created from the second volume data node in an additional in-memory operation on the storage array; and
wherein in conjunction with the creation of the additional snapshot from the second volume data node, a storage protocol personality of the snapshot created from the volume represented as the first volume data node is reassigned to the additional snapshot.

16. The computer program product of claim 15 wherein computer program code for maintaining the snapshot as a logical point in time copy of the volume for data protection of the volume comprises computer program code for maintaining the point in time copy of the volume with no additional storage overhead for the point in time copy of the volume.

17. The computer program product of claim 15 further comprising computer program code for recovering the volume at the point in time.

18. The computer program product of claim 17 wherein computer program code for recovering the volume at the point in time comprises:
computer program code for creating a new snapshot of the point in time copy snapshot; and
computer program code for assigning the SCSI personality of the volume to the new snapshot.

19. The computer program product of claim 17 further comprising computer program code for updating an external volume ID in a mapping of offsets and external volume ID.

20. The computer program product of claim 18 further comprising computer program code for retaining the point in time copy of the volume snapshot for data protection.

21. The computer program product of claim 15 further comprising:
computer program code for representing the volume as the first volume data node in a tree of nodes; and
computer program code for representing the snapshot as a child node of the first volume data node.

* * * * *